(12) United States Patent
Fiducci

(10) Patent No.: US 12,405,810 B1
(45) Date of Patent: Sep. 2, 2025

(54) SYSTEM AND METHOD FOR A BROWSER-BASED VIRTUAL DESKTOP SYSTEM

(71) Applicant: Thomas E. Fiducci, Chicago, IL (US)

(72) Inventor: Thomas E. Fiducci, Chicago, IL (US)

( * ) Notice: Subject to any disclaimer, the term of this patent is extended or adjusted under 35 U.S.C. 154(b) by 0 days.

(21) Appl. No.: 18/912,902

(22) Filed: Oct. 11, 2024

Related U.S. Application Data

(60) Division of application No. 17/875,168, filed on Jul. 27, 2022, which is a continuation of application No. 17/166,686, filed on Feb. 3, 2021, now Pat. No. 11,403,122.

(51) Int. Cl.

| | |
|---|---|
| *G06F 3/048* | (2013.01) |
| *G06F 3/04817* | (2022.01) |
| *G06F 3/04842* | (2022.01) |
| *G06F 9/451* | (2018.01) |
| *G06F 21/45* | (2013.01) |
| *G06F 21/62* | (2013.01) |
| *G06F 3/06* | (2006.01) |

(52) U.S. Cl.
CPC .......... *G06F 9/452* (2018.02); *G06F 3/04817* (2013.01); *G06F 3/04842* (2013.01); *G06F 21/45* (2013.01); *G06F 21/6218* (2013.01); *G06F 3/0622* (2013.01); *G06F 3/0659* (2013.01); *G06F 3/0664* (2013.01); *G06F 3/067* (2013.01); *G06F 2221/2141* (2013.01)

(58) Field of Classification Search
CPC .. G06F 9/452; G06F 3/04817; G06F 3/04842; G06F 21/45; G06F 21/6218; G06F 3/0622; G06F 3/0659; G06F 3/0664; G06F 3/067; G06F 2221/2141
See application file for complete search history.

(56) References Cited

U.S. PATENT DOCUMENTS

| | | | | |
|---|---|---|---|---|
| 9,367,337 | B1 * | 6/2016 | Eilam | G06F 16/9535 |
| 10,318,320 | B1 * | 6/2019 | Thomas | G06F 9/45558 |
| 10,476,868 | B2 | 11/2019 | Fiducci | |
| 11,403,122 | B1 | 8/2022 | Fiducci | |

(Continued)

FOREIGN PATENT DOCUMENTS

| | | | | |
|---|---|---|---|---|
| CN | 101329600 A | * | 12/2008 | G06F 1/1613 |
| CN | 102158526 A | * | 8/2011 | G06F 16/188 |

*Primary Examiner* — Rashawn N Tillery
(74) *Attorney, Agent, or Firm* — Chiacchio IP, LLC; Theodore J. Chiacchio

(57) ABSTRACT

A virtual desktop data storage retrieval system that allows a plurality of user accounts each to create one or more virtual desktops. These are maintained and managed on a system computer running one or more virtual servers and communicated over a network to a user's browser on a user device. The browser-based virtual desktops provide the account user's functionally, and allow data transfer to and from a virtual storage system associated with the system computer. The system allows each account user to have one or more changeable virtual desktops with changeable icons and changeable icon functions reflecting the account user's preferences. Each account user can create and share one or more virtual desktop, its icons, and functions associated with the selected icons with another account user's virtual desktop while setting up file rights for each assigned shared account user, and controlling which functions the shared account users can perform.

18 Claims, 35 Drawing Sheets

(56) References Cited

U.S. PATENT DOCUMENTS

| | | |
|---|---|---|
| 2002/0010736 A1 | 1/2002 | Marques et al. |
| 2004/0225968 A1* | 11/2004 | Look .................. G06F 3/04812 715/778 |
| 2007/0260702 A1 | 11/2007 | Richardson et al. |
| 2009/0276771 A1* | 11/2009 | Nickolov ............... G06Q 30/04 718/1 |
| 2010/0005409 A1 | 1/2010 | Ratzlaff |
| 2010/0269135 A1 | 10/2010 | Hulse et al. |
| 2012/0066607 A1* | 3/2012 | Song .................... G06F 9/5077 715/737 |
| 2012/0066679 A1 | 3/2012 | Pappas et al. |
| 2012/0317295 A1 | 12/2012 | Baird et al. |
| 2013/0007465 A1 | 1/2013 | Movassaghi |
| 2014/0165164 A1* | 6/2014 | Pizurica ................ G06F 3/0482 715/741 |
| 2014/0258155 A1* | 9/2014 | Suryanarayanan ......................... H04L 67/1021 726/29 |
| 2015/0058837 A1* | 2/2015 | Govindankutty ......... G06F 8/63 718/1 |
| 2015/0256474 A1* | 9/2015 | Ringdahl .................. G06F 9/46 709/226 |
| 2016/0378535 A1* | 12/2016 | Oh ........................ G06F 9/4451 718/1 |
| 2017/0149853 A1* | 5/2017 | Furuichi ............... H04L 65/403 |
| 2018/0084087 A1 | 3/2018 | Sharma |
| 2018/0284959 A1* | 10/2018 | Alphin, III ........... G06Q 10/109 |
| 2019/0230165 A1* | 7/2019 | Wang .................... G06F 9/452 |
| 2020/0110792 A1 | 4/2020 | Tsabba |
| 2020/0252472 A1 | 8/2020 | Vajravel et al. |
| 2021/0037015 A1* | 2/2021 | Deora ................ H04L 63/0861 |

\* cited by examiner

Fig. 2

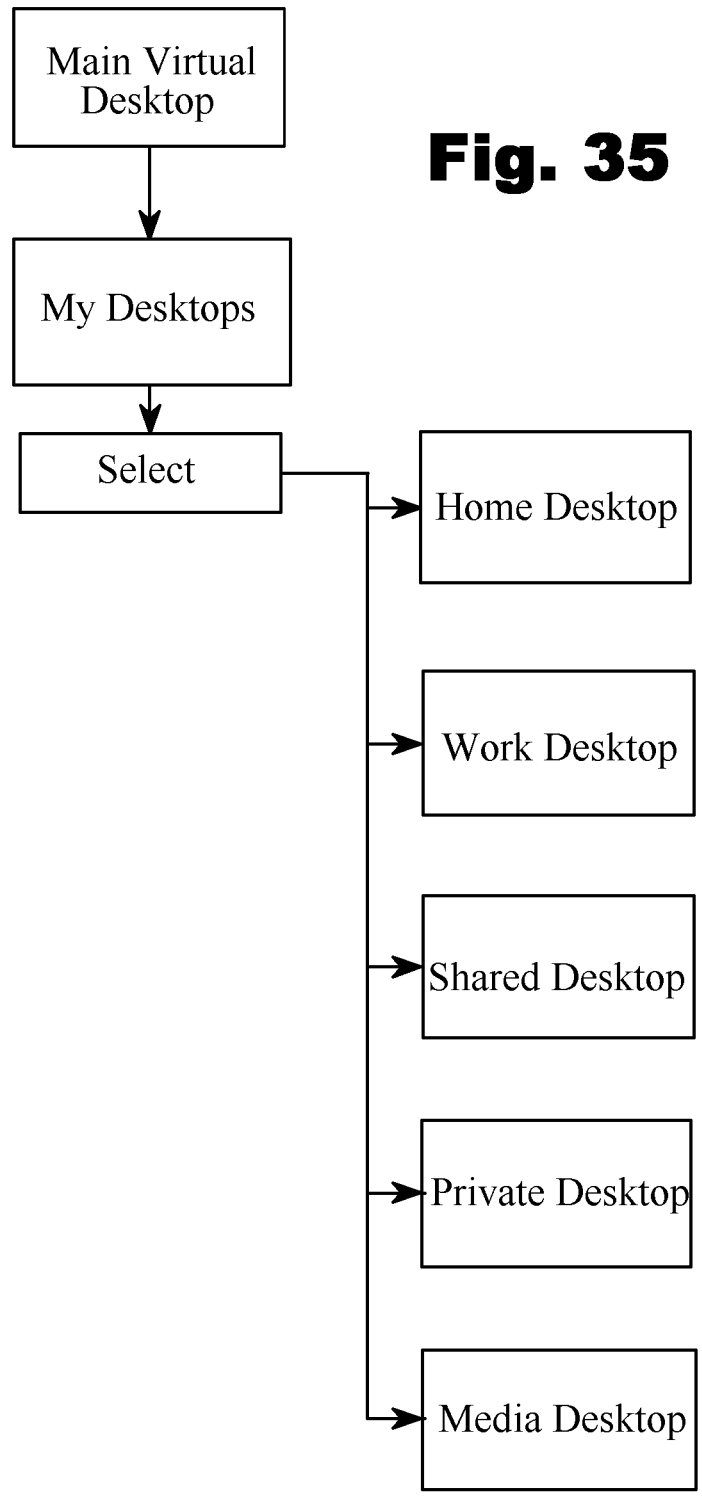

SYSTEM AND METHOD FOR A BROWSER-BASED VIRTUAL DESKTOP SYSTEM

This application is a divisional application of U.S. patent application Ser. No. 17/875,168, filed Jul. 27, 2022, which is herein incorporated by reference in its entirety, and which is a continuation of U.S. patent application Ser. No. 17/166,686, filed Feb. 3, 2021.

BACKGROUND

Field of the Invention

The present invention relates generally to computer browser systems, and more particularly to a system and method of a browser-based virtual desktop system.

Description of the Problem Solved

A typical computer operating system displays a single desktop. This leads to very limited ability to have an open work space. Every file or function that is not shown on the desktop is hidden somewhere on a disk or in the operating system. To find such files, or other information, a user is forced to use a menu or directory or to perform a search. Present systems do not provide for the fact that computer users typically perform different tasks on their computers all within the same desktop. Prior art systems use a single desktop that is part of the operating system. Icons, folders and anything else found on the desktop are kept in an operating system file on the user device.

What is badly needed is a system and method that provides any number of virtual desktops on demand (including one), so that when a user wishes to perform a specific task, keeping it separate from another, a totally separate desktop can be displayed. A virtual desktop would be a desktop (with icons, files, folders and the like) that is presented on a browser, is not part of the user device operating system, but rather is maintained on a virtual server that runs on a remote system computer and supplied to the browser over a network.

It would be very advantageous if each of the virtual desktops had its own set of icons attached to files and functions that represent the particular unique subject matter addressed by that particular virtual desktop.

SUMMARY OF THE INVENTION

The present invention relates to a virtual desktop system that includes a remote system computer having a processor coupled to a memory. The remote system computer runs one or more virtual servers that provide virtual desktops to any number of user devices over a network. The user devices run only a browser, with the virtual desktops being supplied to, and displayed by the browser on each user device. The virtual server also manages user accounts, where each user account is allowed to create one or more virtual desktops and/or sub-accounts. Each virtual desktop relates to particular subject matter and can include one or more icons attached to files, or functions related to the particular subject matter of the virtual desktop. Each user device is connected to the network and includes a display and local storage. The virtual server verifies user access information received from the user device for a particular user account to create and display the virtual desktops and the icons on the display for that account. The present invention allows each user account to select one or more icons and attach them to files or functions, and allows each user account the ability to add a unique picture file as a custom icon on any of the virtual desktops. The system allows each user account to also select an icon from a library of icons and place it on a virtual desktop for access to particular files or functions, or allows each user account to leave the icons in an options tab and still have access to the attached files or function attached to the particular icons. The system allows each user account to view or edit icons, view or edit files, view or edit virtual desktops with a browser.

Each user account can also create and manage one or more sub-accounts and associate virtual desktops including icons with sub-account users, or can share virtual desktops, icons with functions with other primary account users. An account user can create virtual desktops and icons with functions for data storage and can share data files with other account users controlling all file rights functions for each shared account user using the its browser and the Internet as the network. An account user can create a virtual desktop and add a second password for secured access to it. The system optionally allows an account user to share any virtual desktop with another account user by adding only their email address. All shared desktops and file access by the secondary account user is controlled by the primary account user.

The operating system on the user device is typically only used to perform low level functions such as driving the screen, storage and retrieval of local files, network access and the like. All virtual desktop activity, file storage, file sharing occurs on the virtual server running on the system computer. A user can access the system with any device having a web browser and a network connection, such as to the Internet, to have full access to the virtual desktop and system computer. The system computer can run any number of virtual servers simultaneously. In particular, the user device can be a mobile telephone or handheld smart device.

BRIEF DESCRIPTION OF THE DRAWINGS

Attention is now directed to several figures the illustrate features of the present invention.

FIG. 2. shows the signup page.

FIG. 35 is a flow example of a system with several different virtual desktops created.

Figure 1:
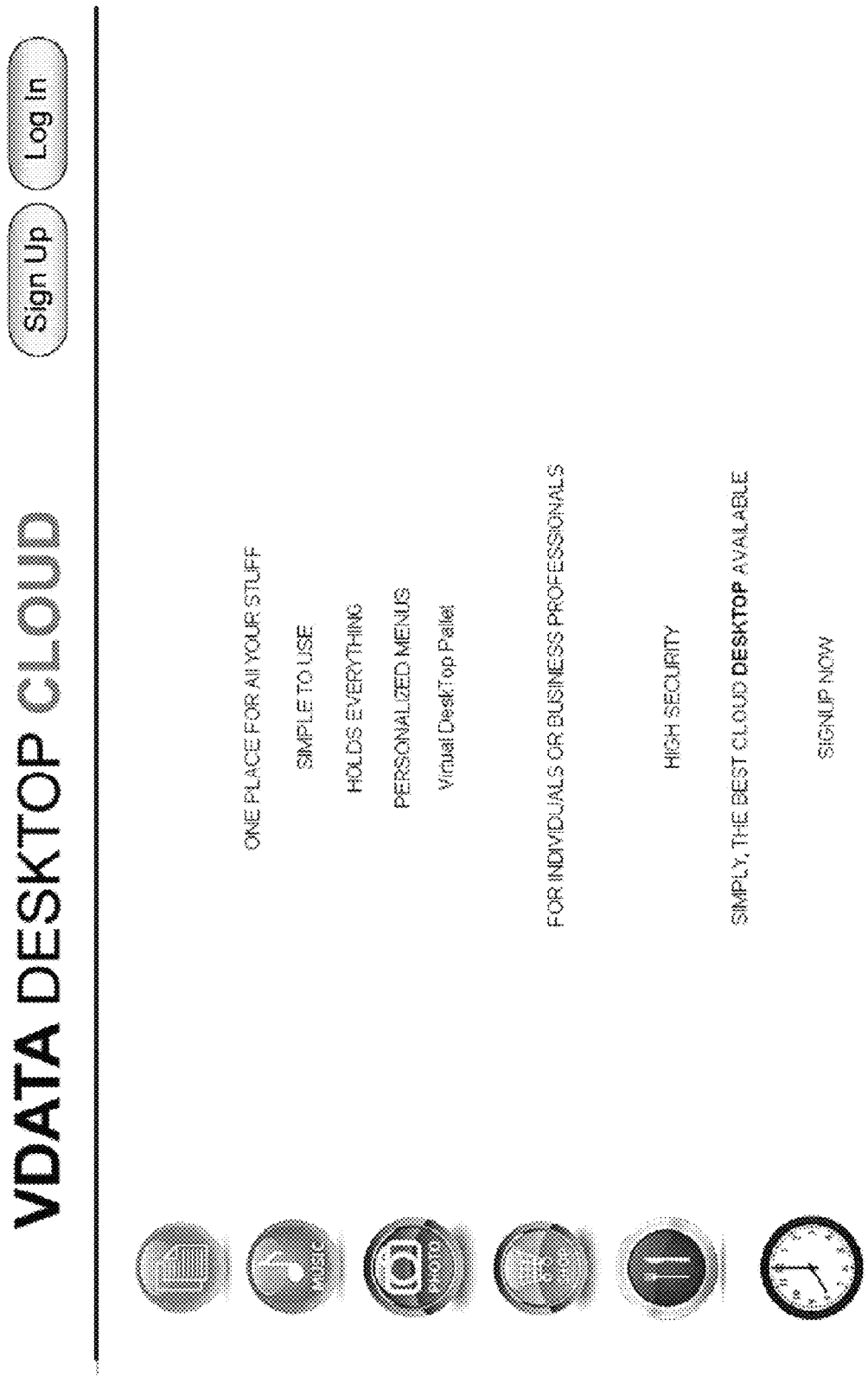
FIG. 1. shows the index page with signup and login links.

Several illustrations have been presented to aid in understanding the present invention. The scope of the present invention is not limited to what is shown in the figures.

DESCRIPTION OF THE PREFERRED EMBODIMENTS

The present invention relates to a system, method and computer program product for storing, viewing, editing and sharing digital files and data using one or more multiple virtual desktops for each account user that are displayed on a browser running on a user device. The user device can be any device capable of running a browser and connecting to a network. The system allows each account user to create multiple virtual desktops for individual functions such as: one or more virtual desktops for storage, retrieval, viewing and editing of: documents, pictures, address books, hyper link bookmarks, calendars, schedulers, note pads, client appointment books, media storage, media viewing, media listening, secure data safes, video conferencing, emails with attachments, clock timed tasks and reminders. The system allows each account user to create one or more virtual desktops for sharing digital files and data with other account users' virtual desktop while controlling the shared virtual desktop, icons, files and functions of the icons for each allowed shared account user. The system allows all these functions to be available and executed with a user device having a browser and using the Internet as a network. While the Internet is preferred, any network is within the scope of the present invention.

An embodiment of the present invention is a virtual desktop system that is browser-based that stores an account user's files. The system allows each account user to have the ability to select icons within the virtual desktop system and assign functions or files to that icon. The system allows each user account the ability to add (upload) pre-made or custom icons into the virtual desktop system using any picture file type to be an icon. (JPEG, JFIF, JPEG 2000, Exif, TIFF, GIF, BMP, PNG, PPM, PGM, PBM, PNM or other types). The system allows each account user the ability to assign any icon on any virtual desktop to a custom function or to files for that account user.

The system allows each account user also the ability to select an icon and put it on a virtual desktop for easy access to the function or files associated with the icon. The system allows each account user the ability to assign an icon for custom functions and files for each virtual desktop within an account user. For example, making a virtual desktop for word docs (or any other type of office files excel, power point, PDF and so on), making another virtual desktop for music files, another for an address book, another for notes, another for a clock and timer, another for a shared virtual desktop, another for a reminder function, another for saved emails, another for the scheduler, another for internet hyper links (bookmarks), and another for any type of file or function within the system.

The system allows each account user the ability to create multiple virtual desktops within one user account and choose whether or not to add a second password for access to that virtual desktop for added security. For example, the ability to create multiple virtual desktops: one virtual desktop for home files, one virtual desktop for work files, one virtual desktop for sharing files, one virtual desktop for private files, one virtual desktop for movies, one virtual desktop for music files and so on. The movie virtual desktop can store movie files that can be viewed on any television or monitor with network access. The music virtual desktop can store music files that can be played on any device with a browser and network access.

The system allows each virtual desktop for an account user typically to have its own storage place to: upload files, download files, store files, view files, edit files, share files, (with another account user) and create files within the virtual desktop that are associated with an account user and is a separate virtual desktop from other created virtual desktops within the same account user.

Each virtual desktop has the full features of putting icons on that virtual desktop with its features and file options attached to icons on that virtual desktop. The system allows each virtual desktop to share files with another user account by sharing the virtual desktop with another account user. Once this is done, the second shared account will have the additional virtual desktop in their list of desktops. The system allows each virtual desktop account user the ability of becoming a primary user giving permissions to another selected virtual desktop account user in sharing a selected virtual desktop its icons and files which will be displayed in the other account user's menu referred to now as a sub-account user.

The system allows each virtual desktop the ability to share icons, files and virtual desktops by attaching an email address to a selected shared virtual desktop in the first account user with its shared files and permissions set. Permissions can be set to: none, view only, edit all files, edit some selected files, re-share files, no re-share files, download files, upload files, change icon functions, not able to change icon functions, limited edits.

An account user can create a special login link unique just to that user account to login with their user their name and password. When this link is created and active, it will disable the main page login. The reason behind this feature is security. If someone obtains a user name and password and tries to login in at the main page, it will not let that person into that account.

The system allows adding an email address to a selected shared virtual desktop and generates an email to that person's email address. A notification is sent letting that user know they have shared files waiting. There is a link within their email that can be clicked on. That user can login to their account or create a new account. Once logged in under the "My Desktops" tab, a dropdown shows the shared virtual desktop with icons and files.

The system allows a first virtual desktop account user to share files and icon functions with another virtual desktop account user setting file rights making the first virtual desktop account user the primary account user and the second virtual desktop account user the sub account. The system allows each icon, file and desktop function of a virtual desktop to be controlled by the account user that initiates the sharing feature, which makes them the primary account user. The second account user is a sub account user.

Simultaneous virtual desktop sharing is also possible. The system allows each user account the ability to simultaneously share virtual desktops as well as icons and files with another account user. The account user that initiates the sharing option to another account is the primary account to the shared sub account. That sub account user can also share files back with the first account user making them the sub account user only for those shared files.

In each shared virtual desktop, the owner of the first account (primary) will have their shared files displayed on one side (such as the left side) of their virtual desktop, and for the second account (sub account) that shares files back with the primary account user, those files will be displayed on the other side (such as the right side) of the primary account's virtual desktop. Each account is a primary account and sub account to each other.

The system allows each account users virtual desktop to set security features such as: enabling a device to login and using a created virtual desktop and features; enabling a password on or off option for the account user to login; or adding another password for each created virtual desktop.

The option tab appearing on the virtual desktop has the ability to add in new features per user requirement such as virtual work order forms, virtual inventory and any other business function per individual business needs.

Compatibility problems and ease of use are common issues with multiple step, installed, synced, non compatible application API software. The present invention's browser based virtual desktop makes it extremely easy for an account user to store, retrieve, share, view, listen, stream and edit digital files within the system, and it provides one place for all digital data files using a device's browser and network connection. The system allows an account user to create one virtual desktop for home personal digital files that is separate from another created virtual desktop for work files. Both are accessible from the account user's devices using a browser with no installed API software needed. The virtual desktop data storage retrieval system has the many features and functionally business professionals need as an all-in-one solution. The virtual desktop can also be used for storage and retrieval of large email attachments which prior art email systems were not designed for. Sharing large attachment files using the virtual desktop is just one feature of the present invention. The virtual desktop is a solution for many industries, since emails with attached files are many times too large for standard email systems to handle.

The system allows an account user to create a virtual desktop for digital music and video files that can be listened to and watched with a music or screen device with a browser and the Internet as the network.

While the description above concentrates on file sharing between multiple users, the present invention includes the embodiment of one user with one device and one or more virtual desktops.

Attention is now directed to the following figures that illustrate features of the present invention.

FIG. 1. shows the index page with signup and login links.

Figure 2:
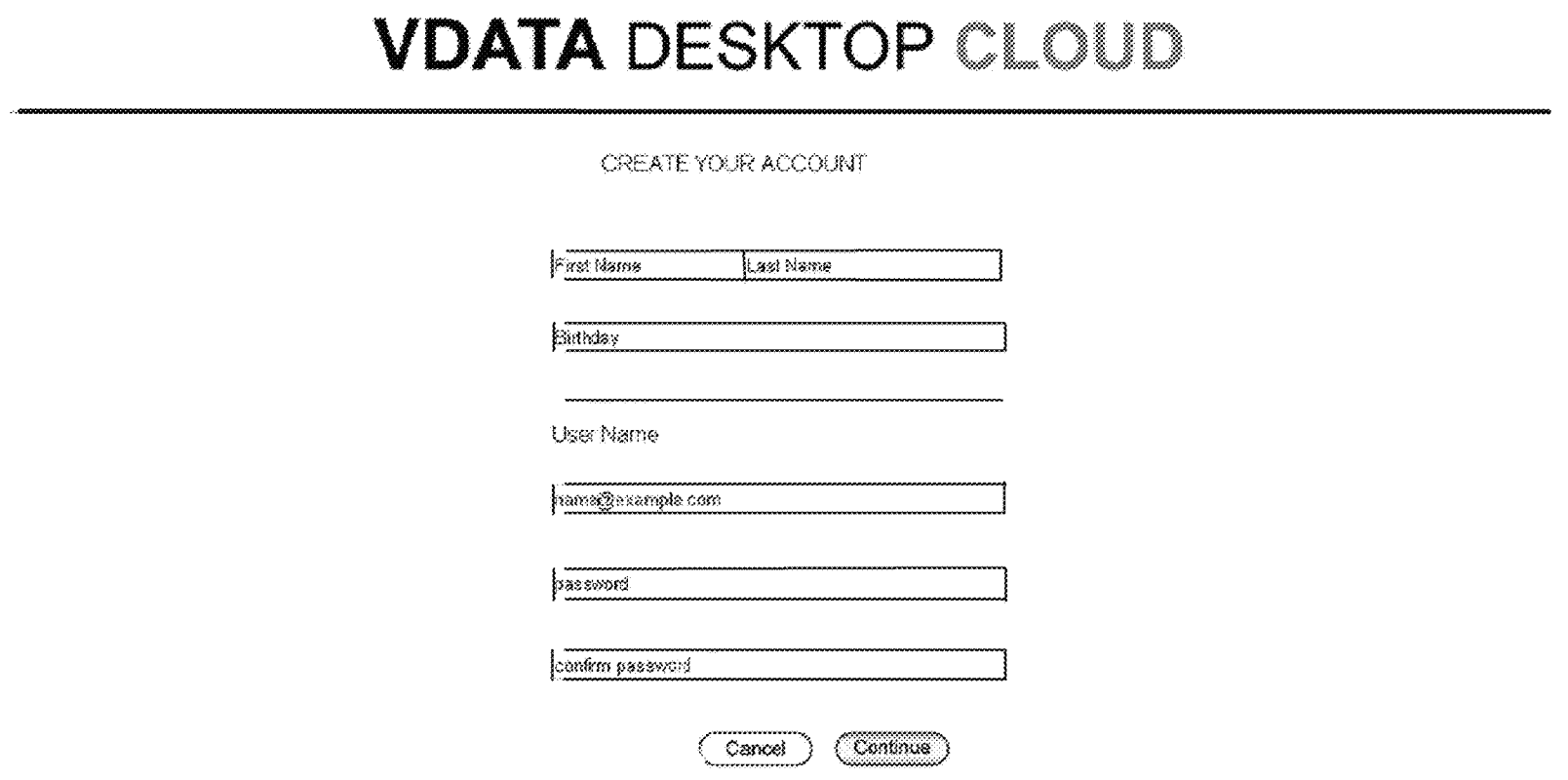

FIG. 2. shows the signup page.

Figure 3:
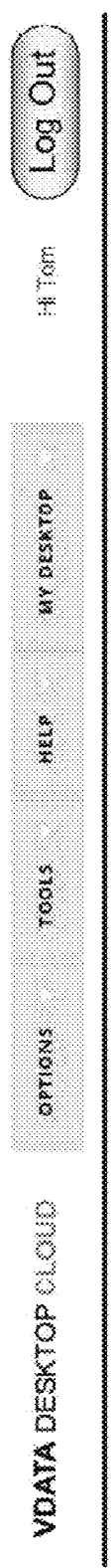
FIG. 3. shows the first virtual desktop screen after login with no icons on desktop.
Figure 3:

FIG. 3. shows the first virtual desktop screen after login with no icons on desktop.

Figure 4:
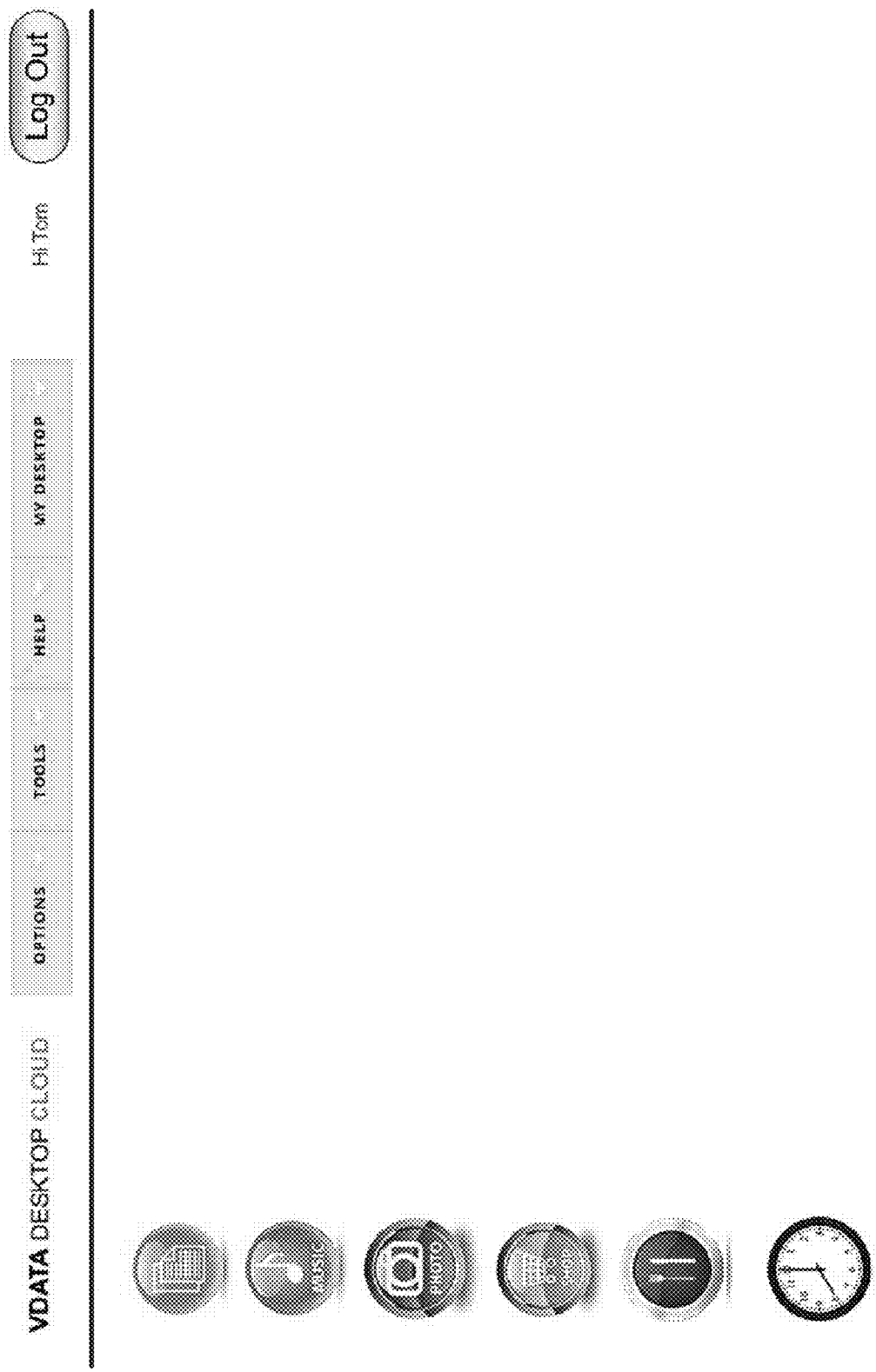
FIG. 4. shows the first virtual desktop screen after login with icons on desktop.

FIG. 4. shows the first virtual desktop screen after login with icons on desktop.

Figure 5:
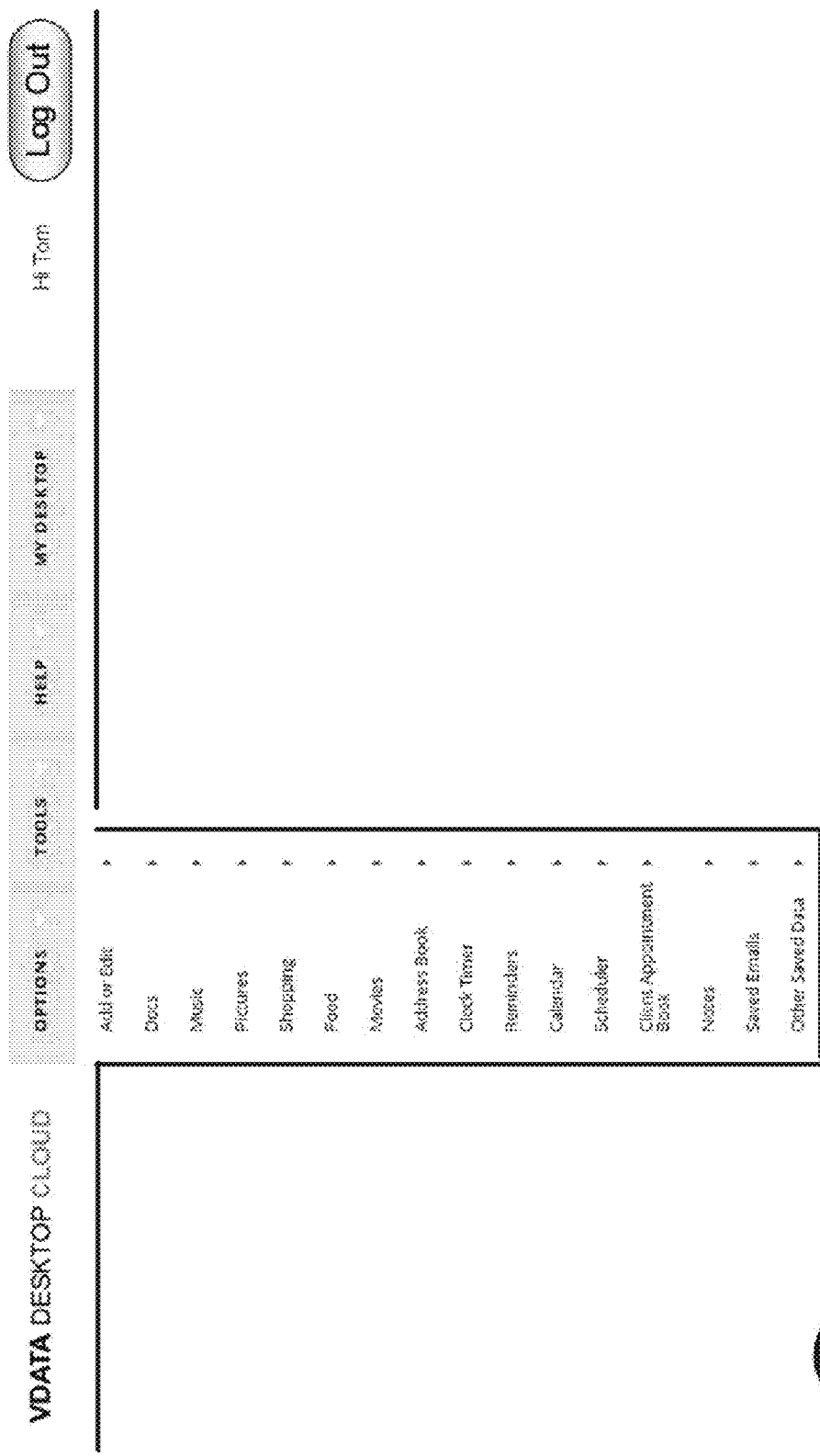
FIG. 5. shows the options menu drop down.
Figure 5:
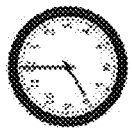

FIG. 5. shows the options menu drop down showing icons and features a user can select, add or edit for icons, virtual desktop, documents, music files, picture files, website shopping hyper links, food restaurants hyper links, movies files, address book, clock timer, reminders, calendar, scheduler, client appointment book, notes, saved emails, other saved data.

Figure 6:
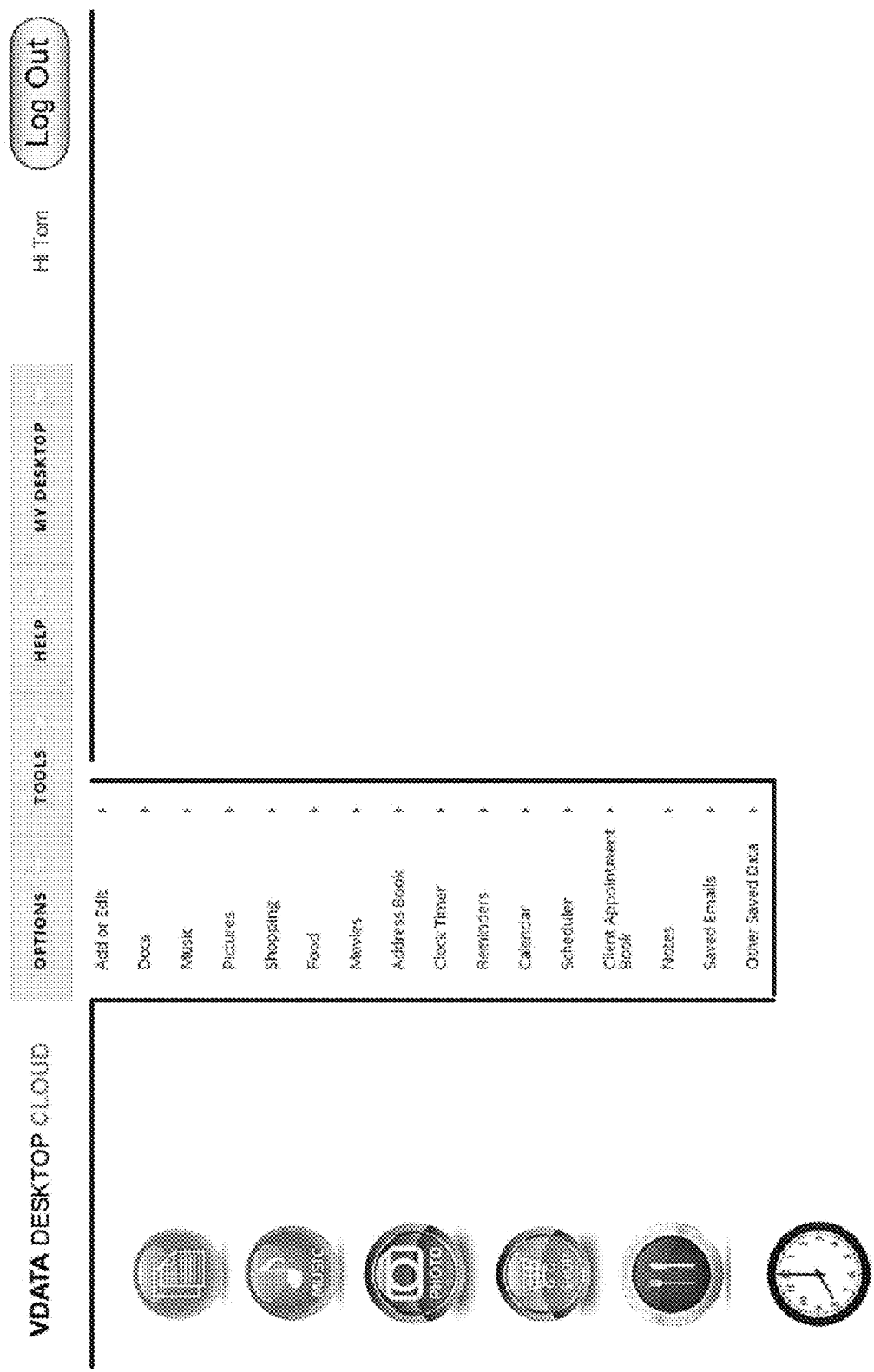
FIG. 6. shows the options menu drop down showing icons and features a user can select, add or edit for icons, virtual desktop, document.

FIG. 6. shows the options menu drop down showing icons and features a user can select, add or edit for icons, virtual desktop, documents, music files, picture files, website shopping hyper links, food restaurants hyper links, movies files, address book, clock timer, reminders, calendar, scheduler, client appointment book, notes, saved emails, other saved data with some icons put on the virtual desktop.

Figure 7:
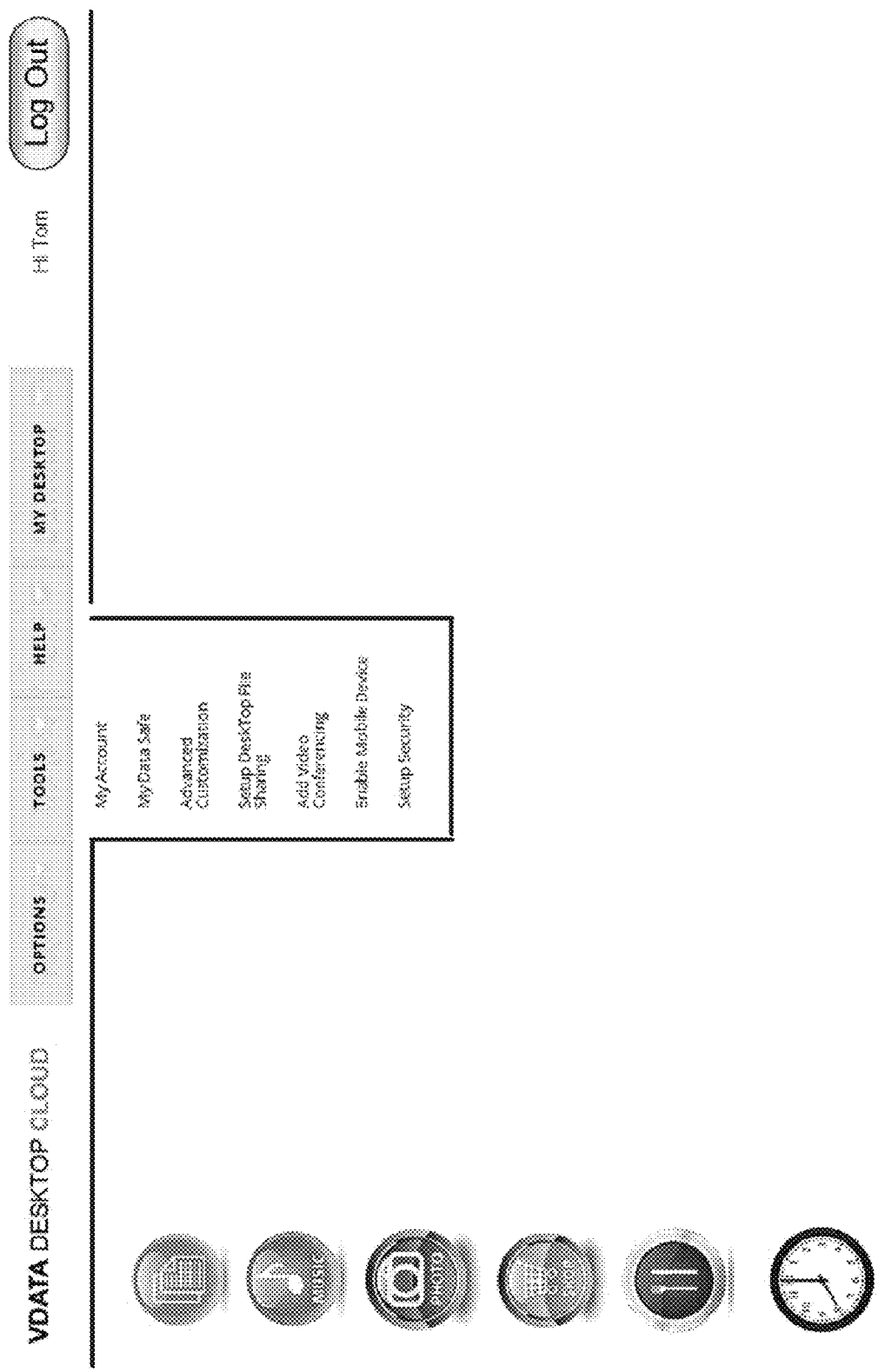
FIG. 7. shows the tool menu drop down features.

FIG. 7. shows the tool menu drop down features, a account user can select a option for adding personal information and editing and setup options for features of the system: (my account) is for the account users personal and billing information, (my data safe), is a separated storage with a extra password to access files stored in the safe. (Advanced customization), an account user can change the color and look of the icons, text font and background colors. (setup desktop file sharing) an account user can setup the virtual desktop sharing being able to control file rights for each icon and attached files, (add video conferencing) an account user can add video conferencing to a shared virtual desktop with each attached shared user video displayed on the right side of the virtual desktop, (enable mobile device) an account user can enable any mobile device to have access to any virtual desktop and control what that mobile device can view or edit. (setup security) an account user can setup allow IP addresses for specific areas of the world to have access to the system user. Meaning my home IP and devices can have access but another location cannot. Its controls the IP address like a firewall.

Figure 8:
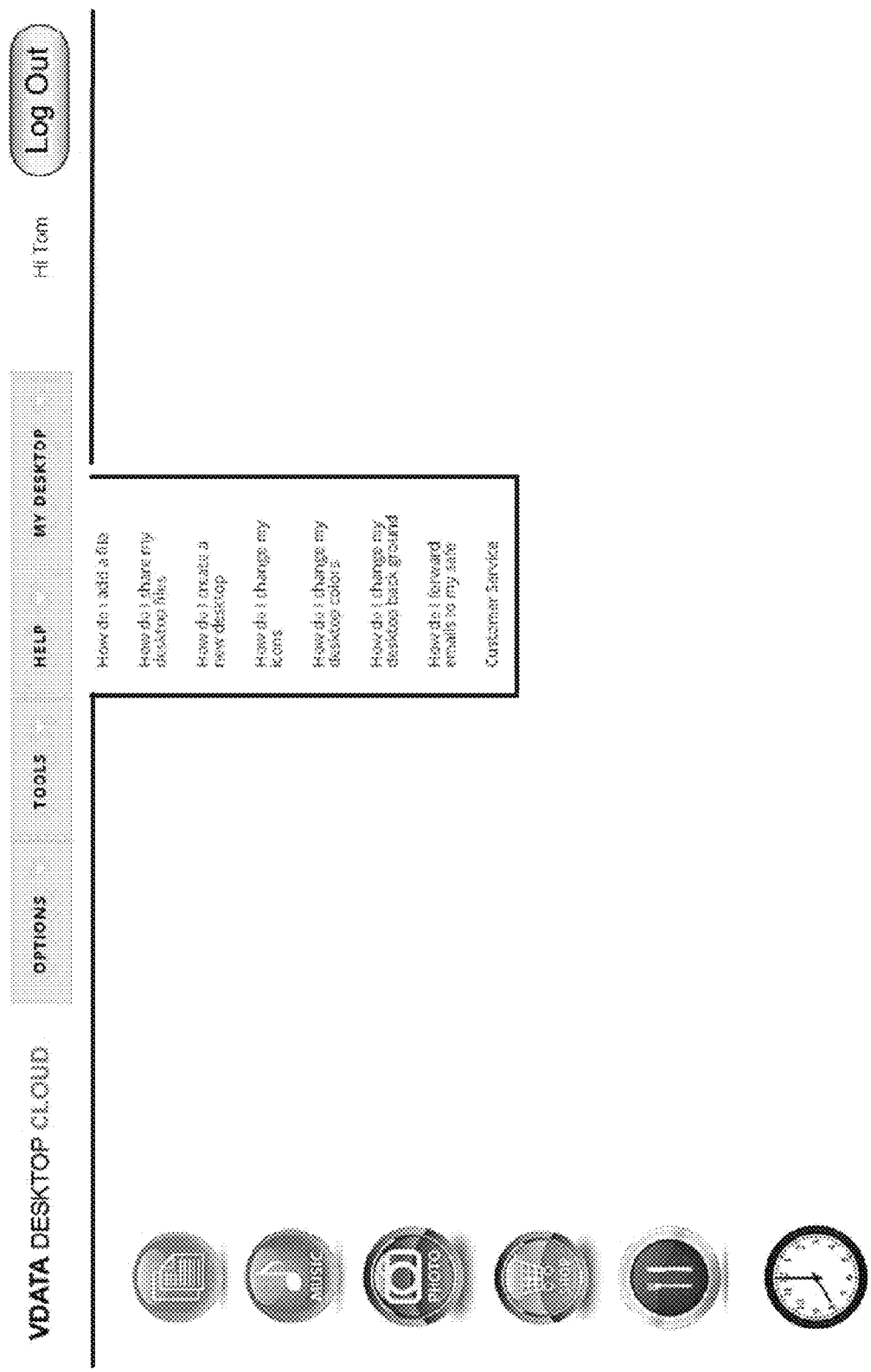
FIG. 8. shows the help menu drop down, an account user can look up a function or feature and read more about how it works in helping the account user use the system.

FIG. 8. shows the help menu drop down, an account user can look up a function or feature and read more about how it works in helping the account user use the system.

Figure 9:
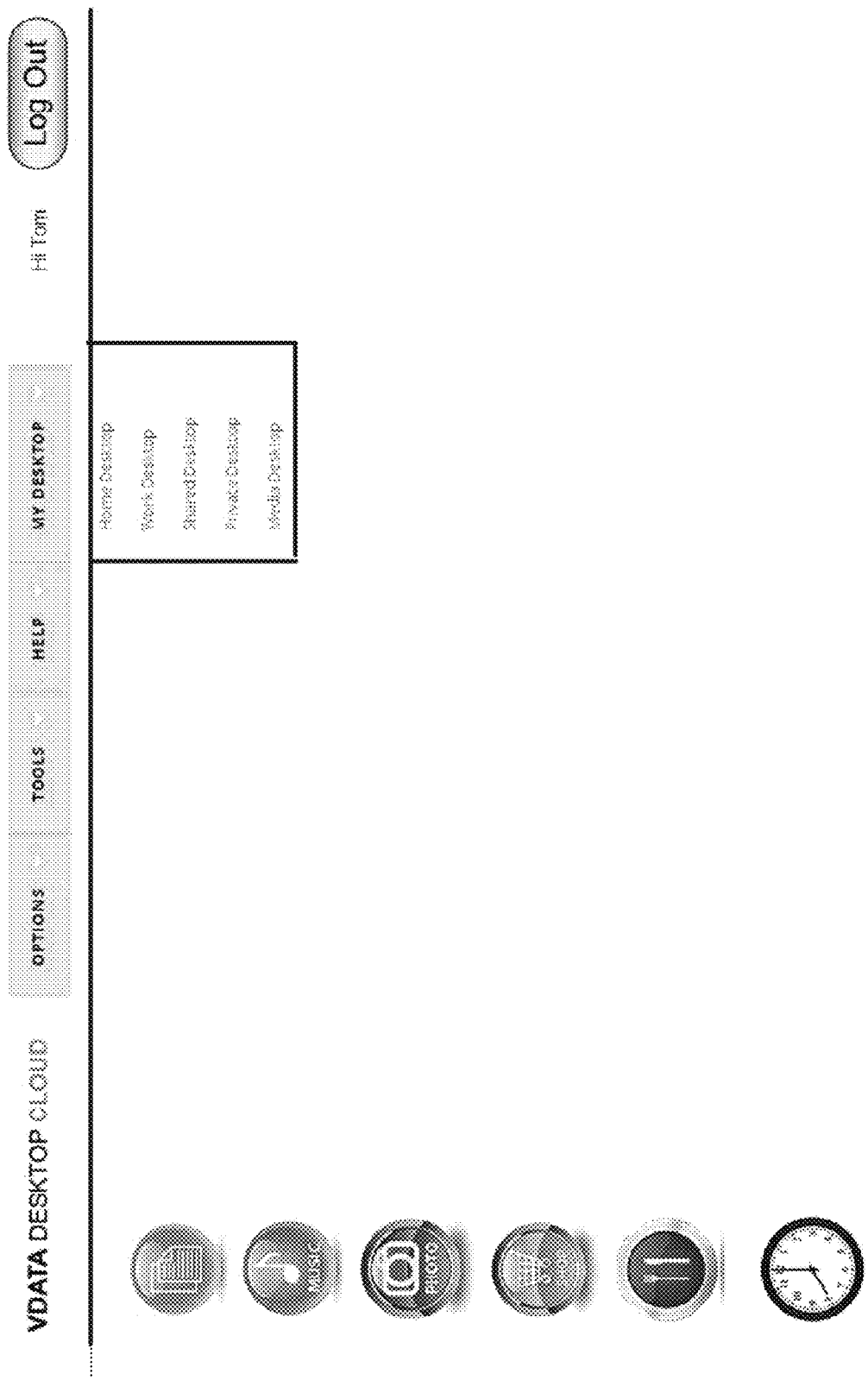
FIG. 9. shows a list of the created virtual desktops to select from in a drop down menu.

FIG. 9. shows a list of the created virtual desktops to select from in a drop down menu.

Figure 10:
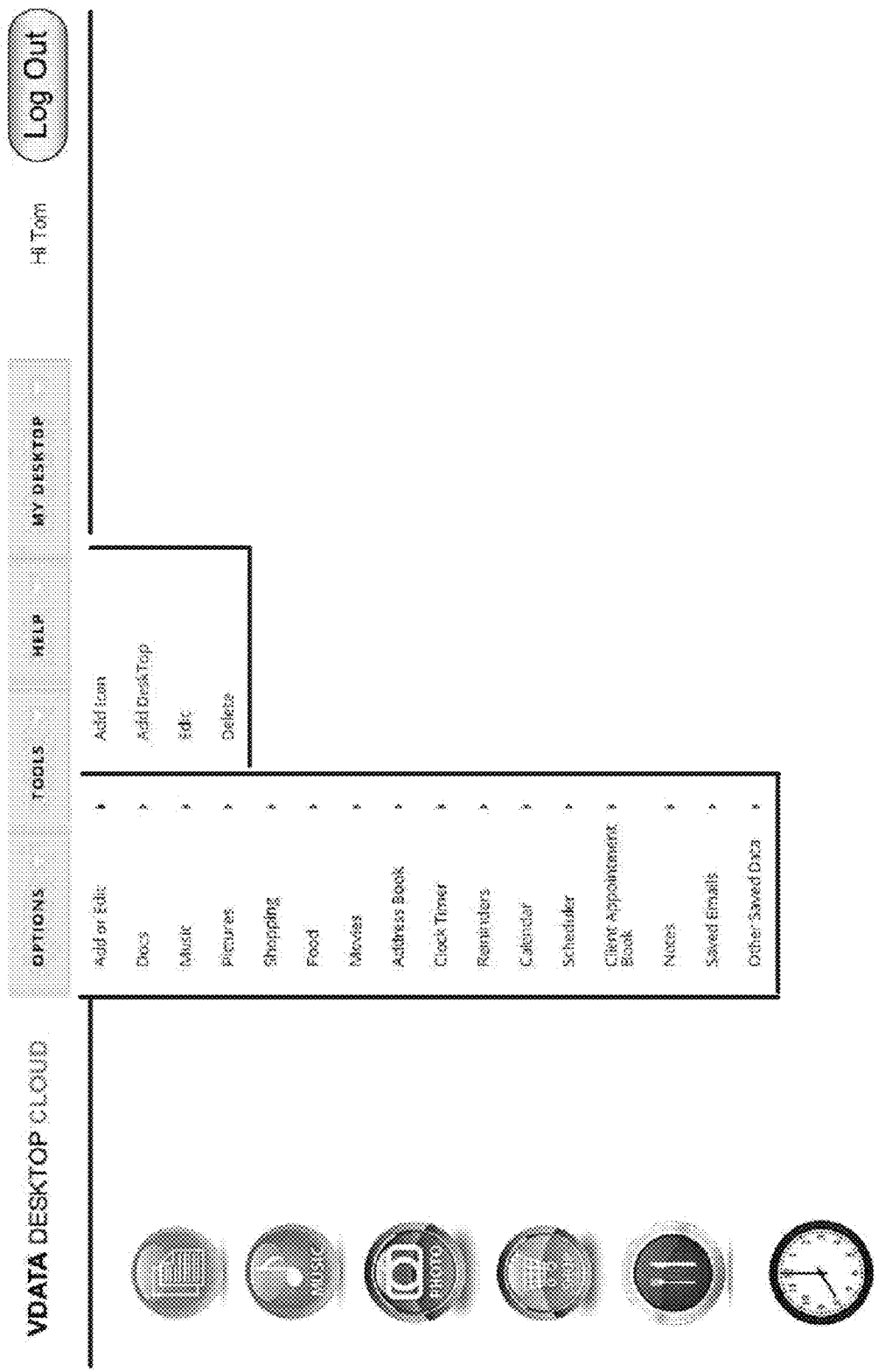
FIG. 10. shows the options menu drop down showing an account user can add, edit or delete icons or virtual desktops.

FIG. 10. shows the options menu drop down showing an account user can add, edit or delete icons or virtual desktop.

Figure 11:
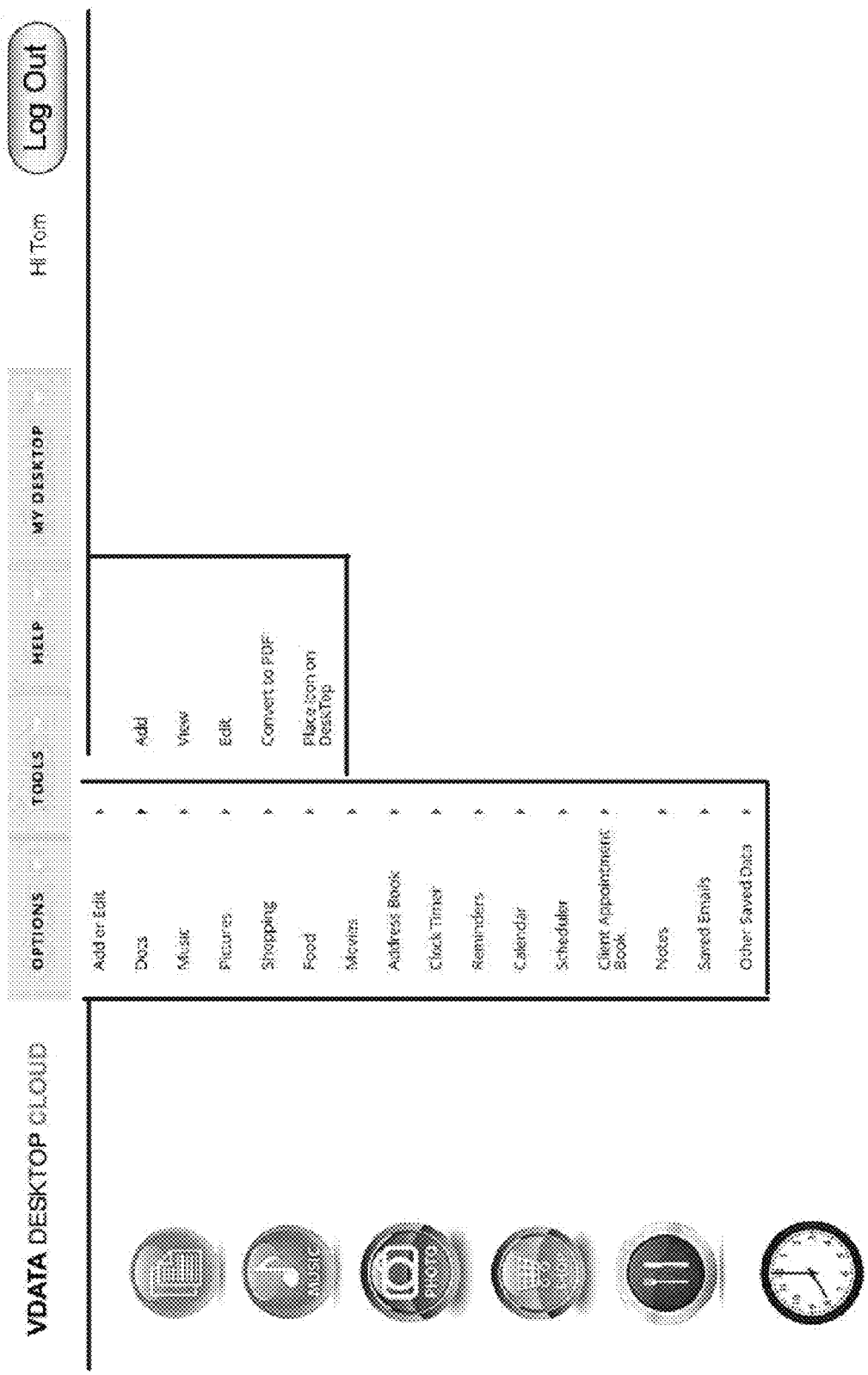
FIG. 11. shows the options menu drop down showing an account user can add, edit or delete a document.

FIG. 11. shows the options menu drop down showing an account user can add, edit or delete a document.

Figure 12:
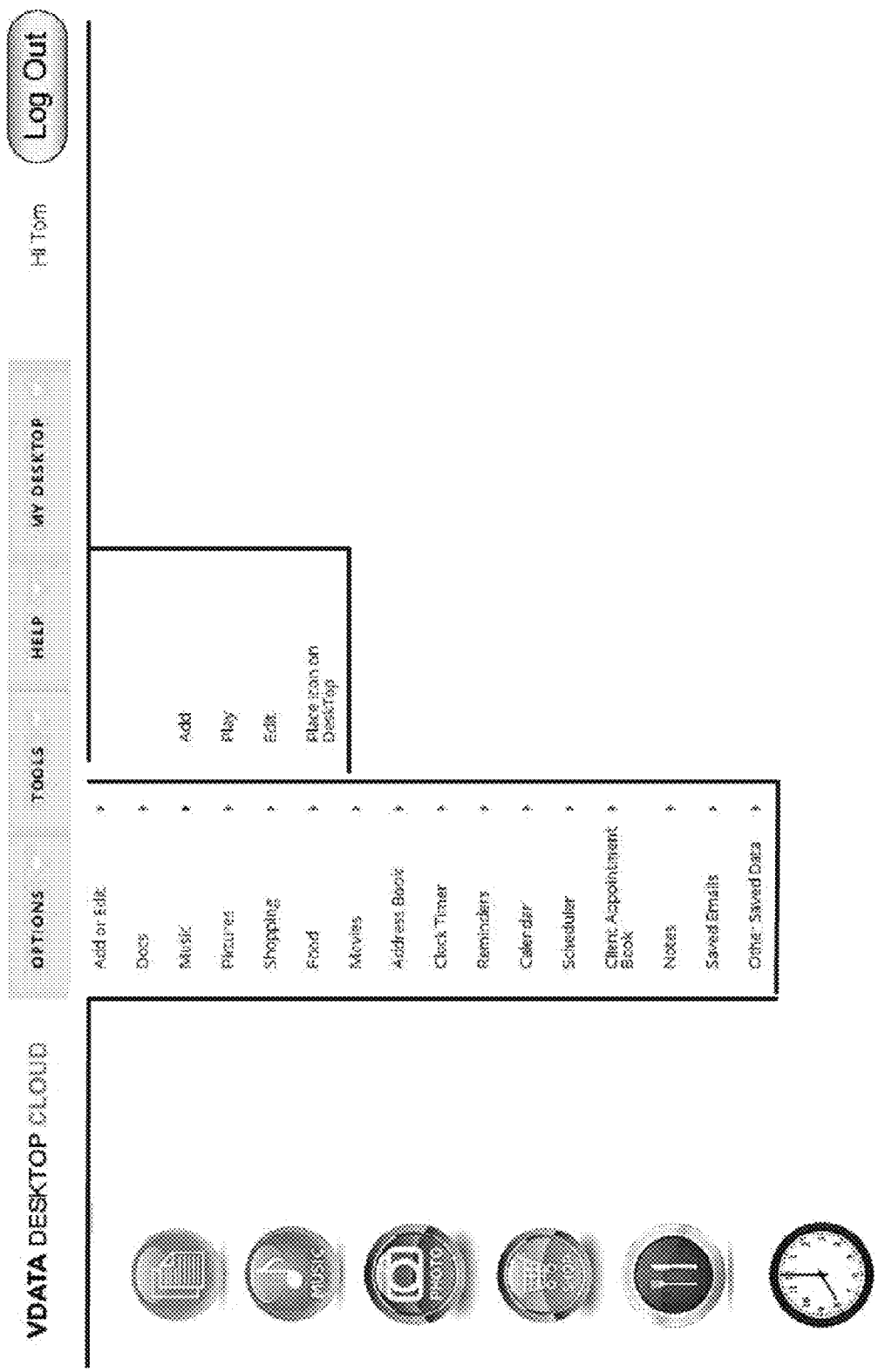
FIG. 12. shows the options menu drop down showing an account user can add, edit or delete a music file.

FIG. 12. shows the options menu drop down showing an account user can add, edit or delete a music file.

Figure 13:
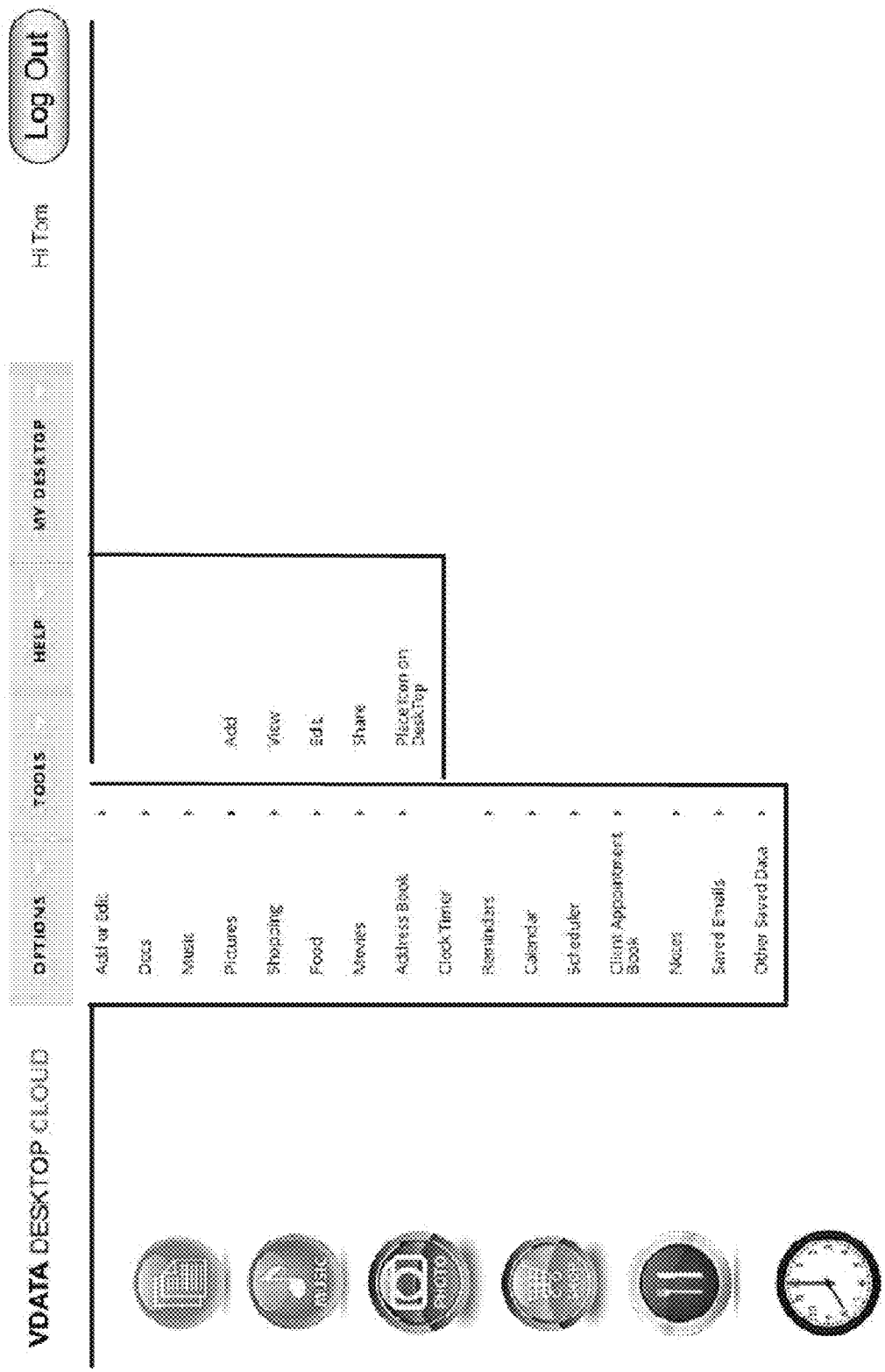
FIG. 13. shows the options menu drop down showing an account user can add, edit or delete a picture file.

FIG. 13. shows the options menu drop down showing an account user can add, edit or delete a picture file.

Figure 14:
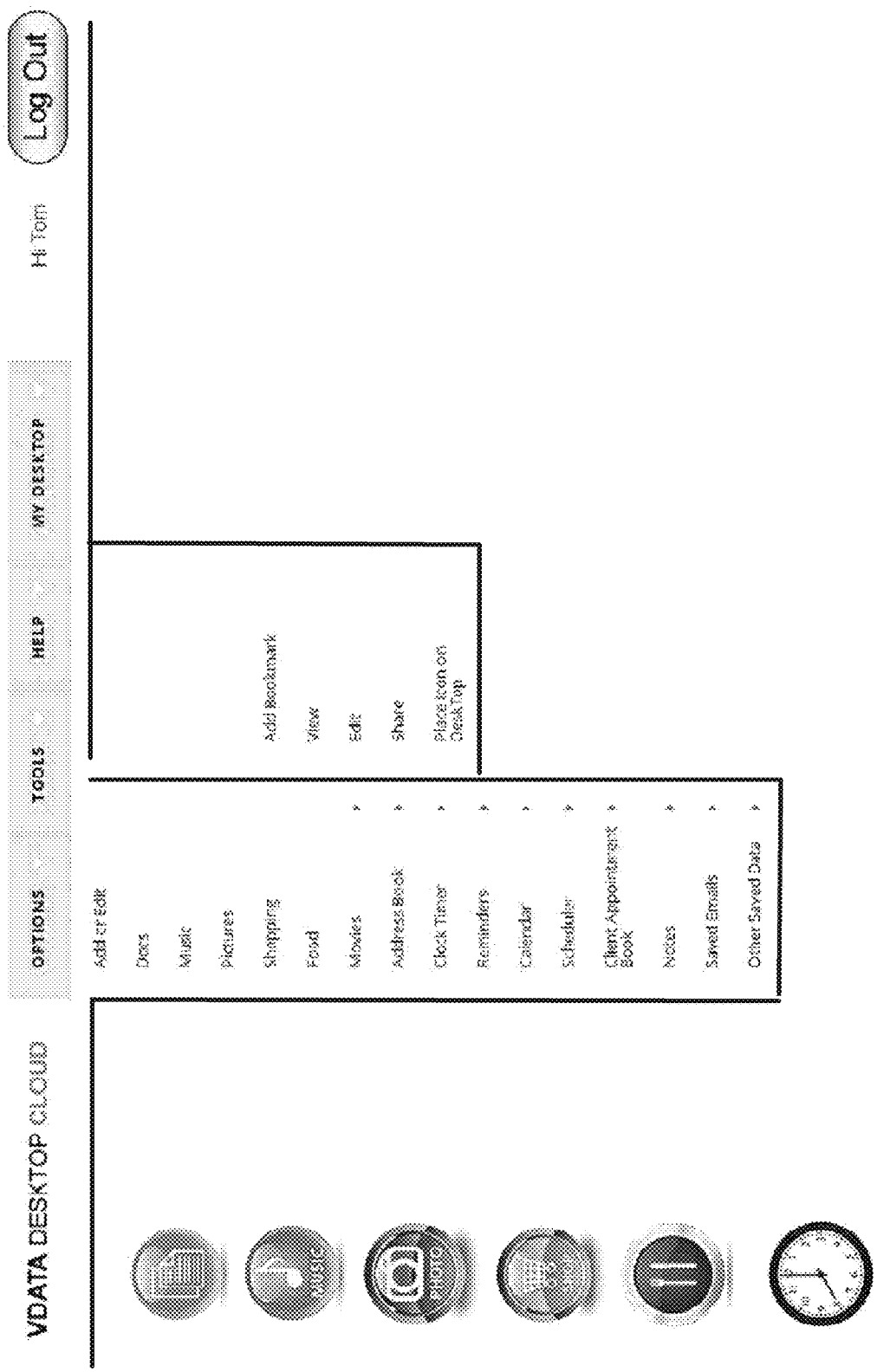
FIG. 14. shows the options menu drop down showing an account user can add, edit or delete a hyper link bookmark for places they shop online.

FIG. 14. shows the options menu drop down showing an account user can add, edit or delete a hyper link bookmark for placed they shop online.

Figure 15:
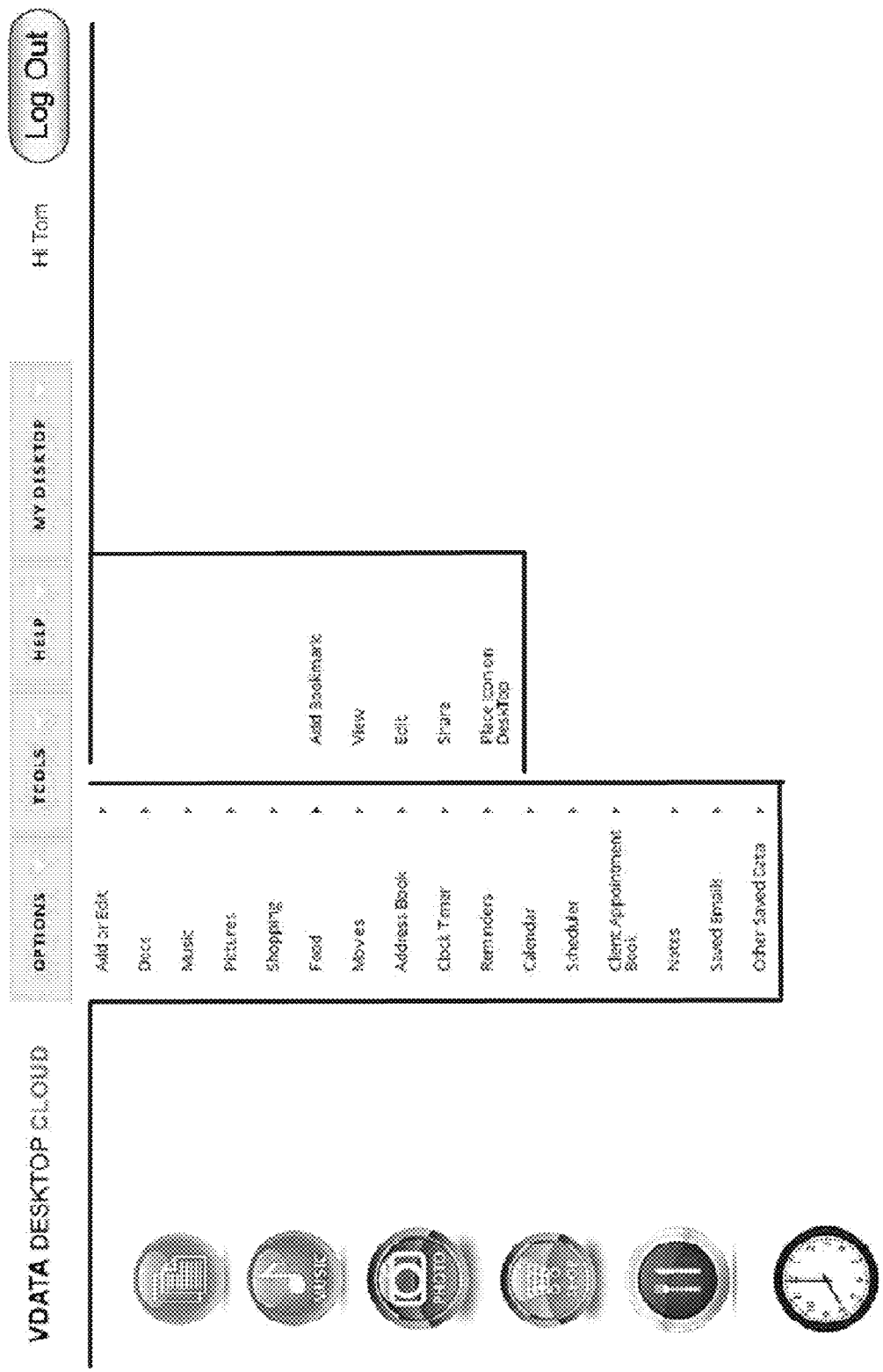
FIG. 15. shows the options menu drop down showing an account user can add, edit or delete a hyper link bookmark for places they order food from online.

FIG. 15. shows the options menu drop down showing an account user can add, edit or delete a hyper link bookmark for placed they order food from online.

Figure 16:
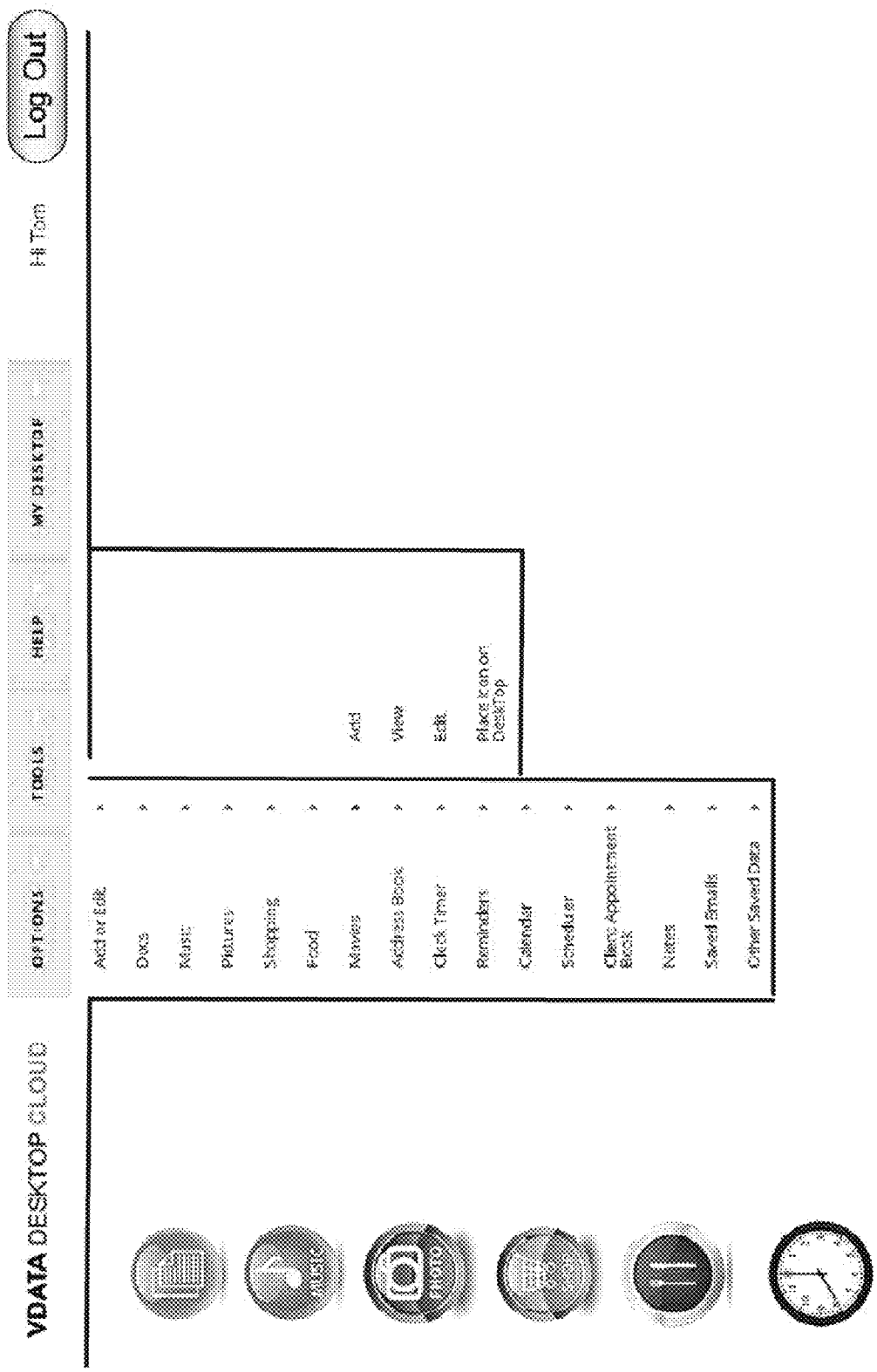
FIG. 16. shows the options menu drop down showing an account user can add, edit or delete a video movie file.

FIG. 16. shows the options menu drop down showing an account user can add, edit or delete a video movie file.

Figure 17:
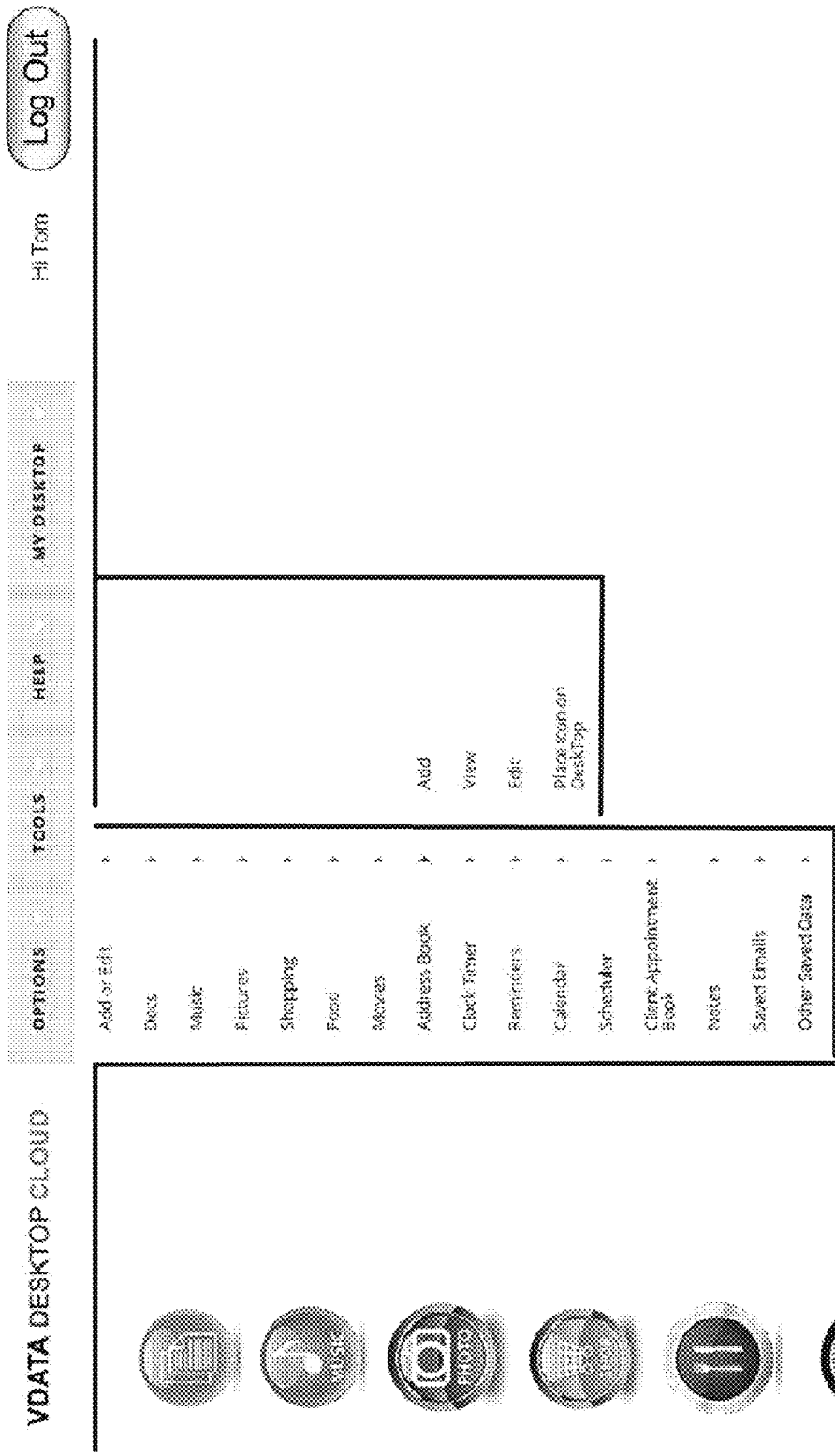
FIG. 17. shows the options menu drop down showing an account user can add, edit or delete a address book.

FIG. 17. shows the options menu drop down showing an account user can add, edit or delete a address book.

Figure 18:
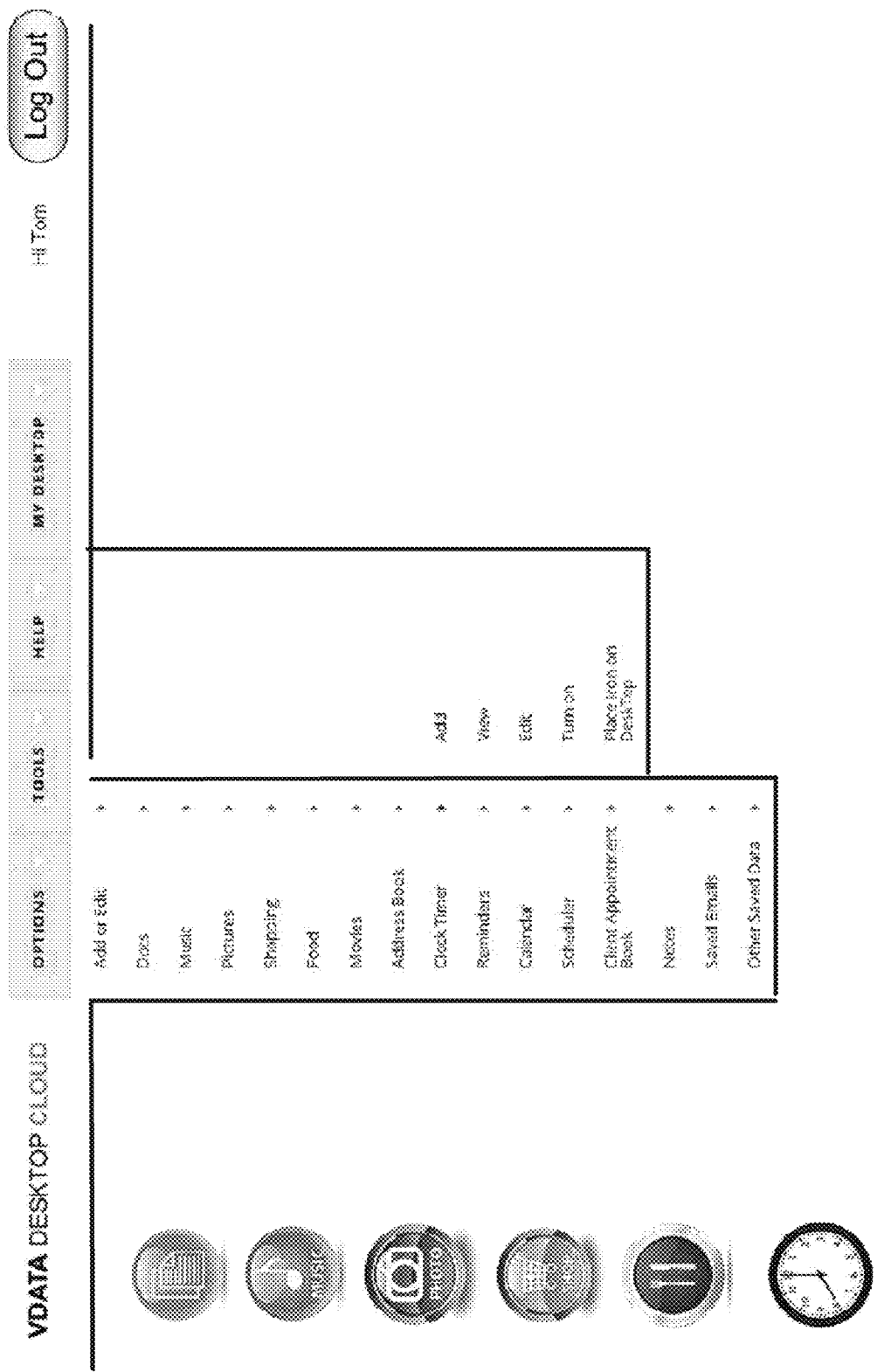
FIG. 18. shows the options menu drop down showing an account user can add, edit or delete a clock timer.

FIG. 18. shows the options menu drop down showing an account user can add, edit or delete a clock timer to keep track of the time when working on a project or watching an online auction. The account user can set up an alarm sound that will sound off when the designated time is reached.

Figure 19:
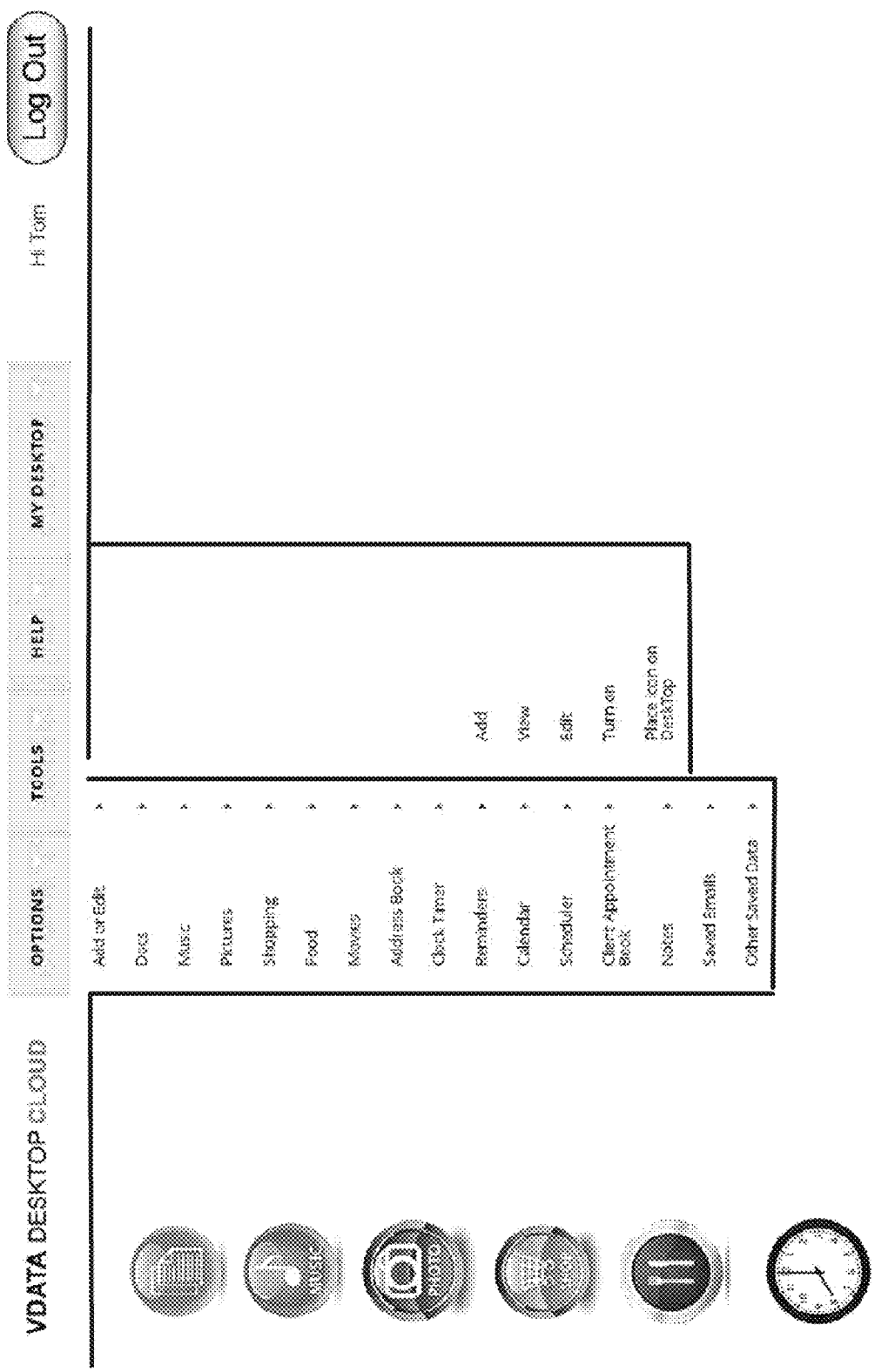
FIG. 19. shows the options menu drop down showing an account user can add, edit or delete a reminder.

FIG. 19. shows the options menu drop down showing an account user can add, edit or delete a reminder. This is perfect for birthdays and renew services. The account user can set up a reminder for any time period and have it repeat as often as desired. And email is sent and or an alarm sound will go off when the designated date is reached. The email and alarm sound can be set to go off at a specific time during the designated date it does not have to go off at 12:01 am the day of.

Figure 20:
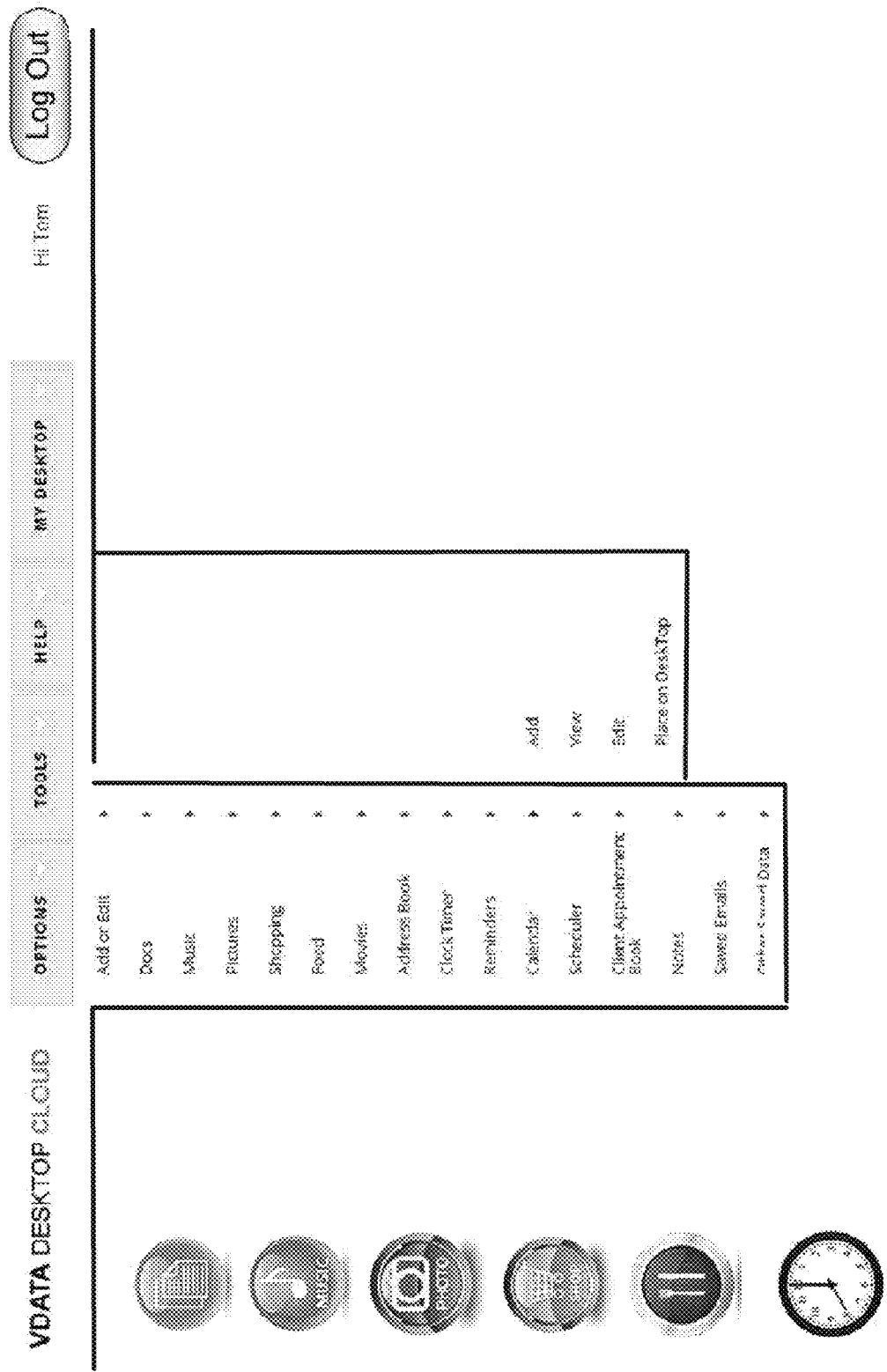
FIG. 20. shows the options menu drop down showing an account user can add, edit or delete a calendar.

FIG. 20. shows the options menu drop down showing an account user can add, edit or delete a calendar. The account user can set up a calendar and place it on any virtual desktop. The account user can also set up a second separate calendar for multiple account users to share. The account user can combine any dates of any calendar to show on one calendar.

Figure 21:
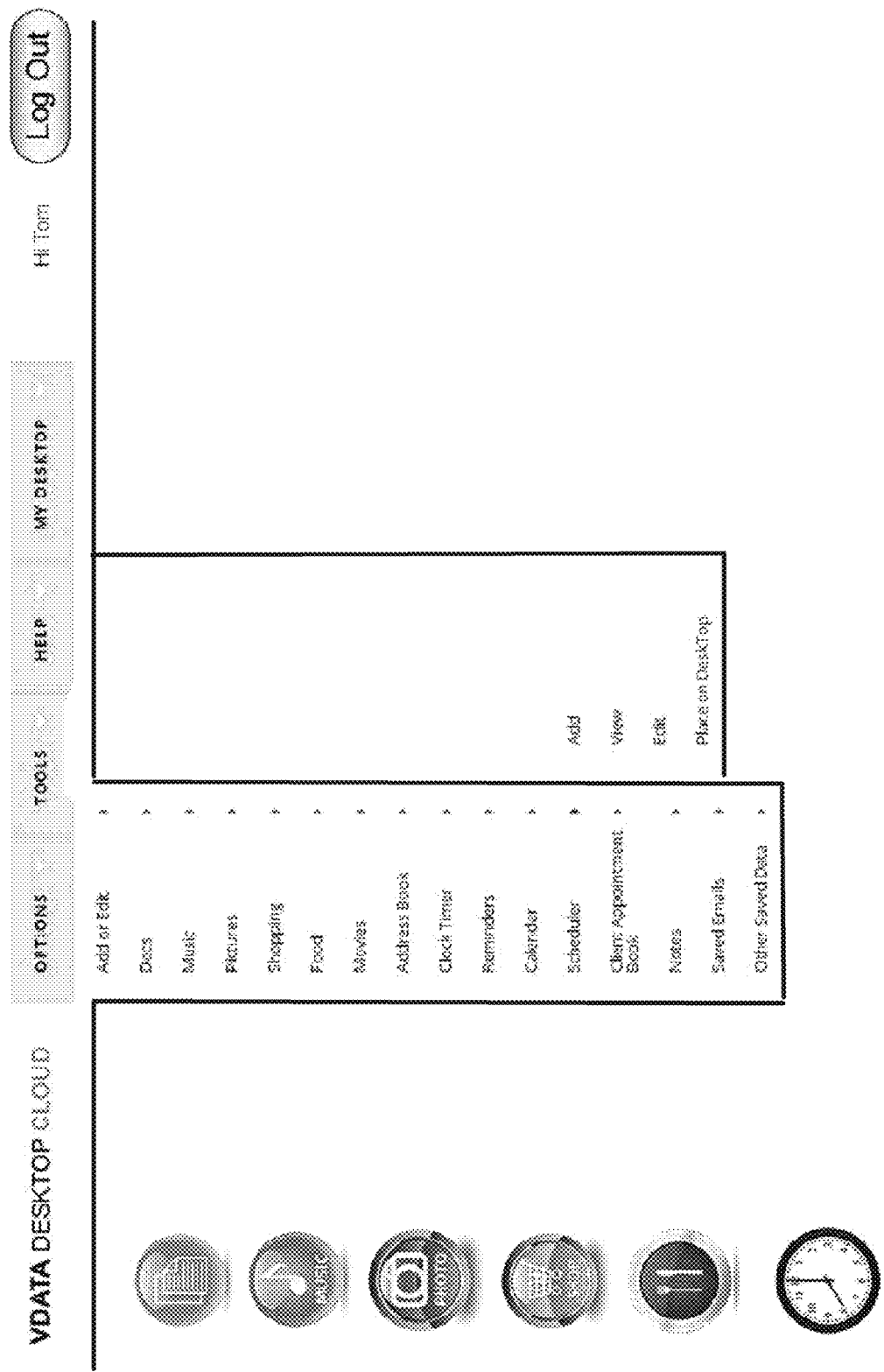
FIG. 21. shows the options menu drop down showing an account user can add, edit or delete a scheduler.

FIG. 21. shows the options menu drop down showing an account user can add, edit or delete a scheduler. The account user can set up a scheduler and place it on any virtual desktop or on its own or connect it to any calendar as a click through per date day. The account user can also set up a second separate scheduler for multiple account users to share. The account user can combine any time and dates of any scheduler to show on one scheduler.

Figure 22:
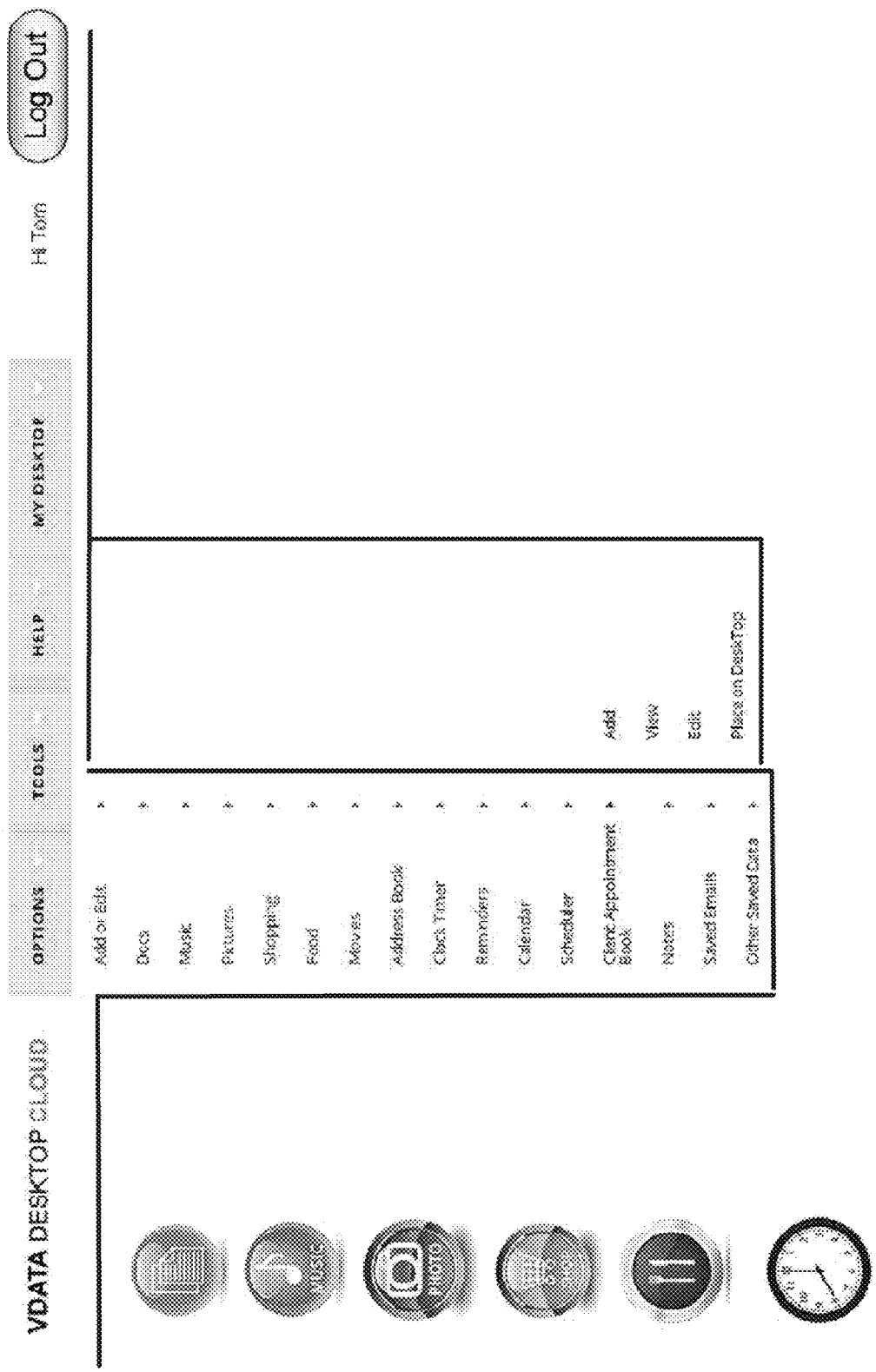
FIG. 22. shows the options menu drop down showing an account user can add, edit or delete a client appointment book.

FIG. 22. shows the options menu drop down showing an account user can add, edit or delete a client appointment book. The account user can set up a client appointment book for any business that book appointments. This feature is great for hair salons or medical offices.

Figure 23:
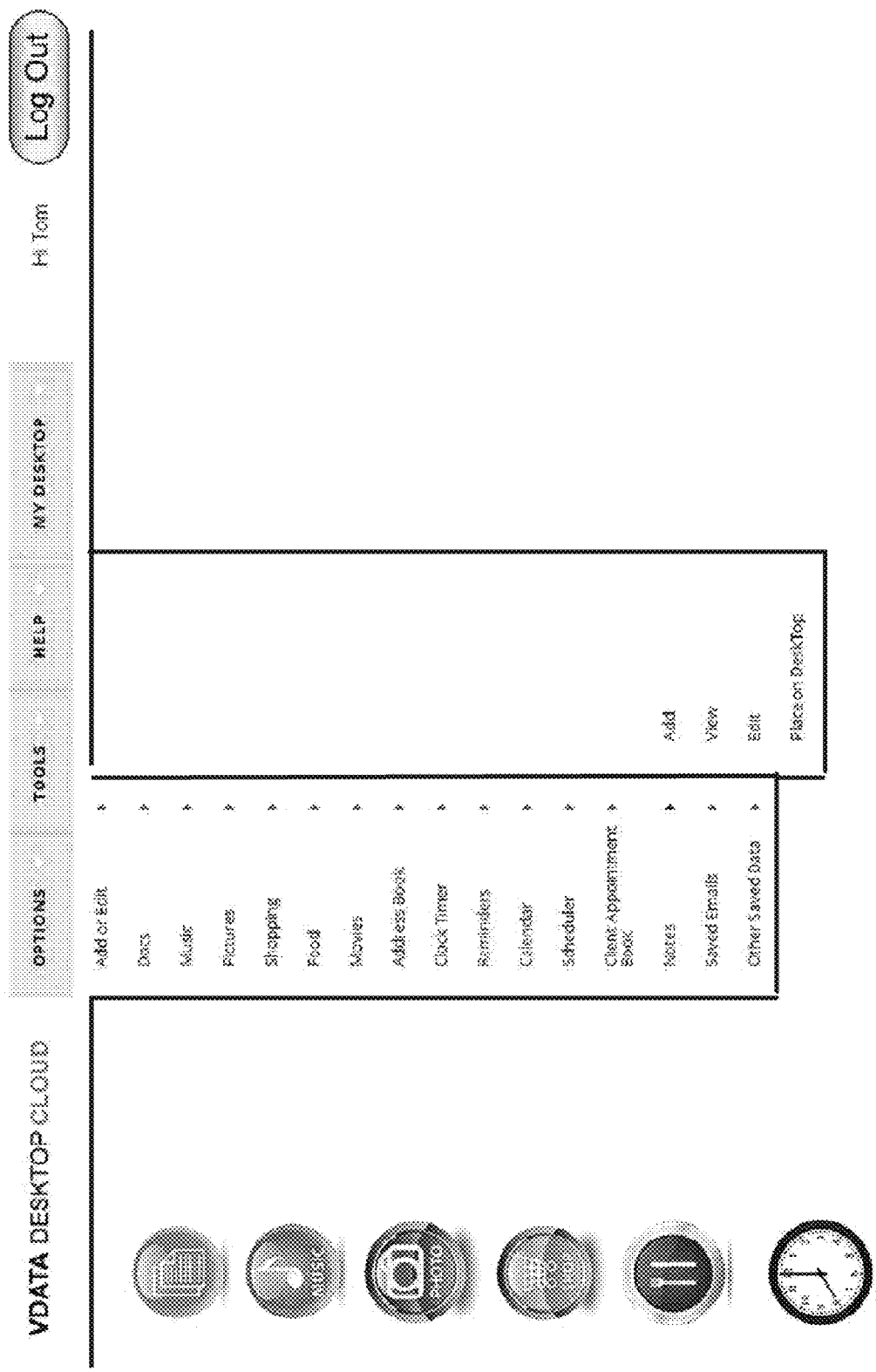
FIG. 23. shows the options menu drop down showing an account user can add, edit or delete a note pad.

FIG. 23. shows the options menu drop down showing an account user can add, edit or delete a note pad. The account user can set up a note pad and place it on any virtual desktop or. The account user can also set up a second separate note pad for multiple account users to share. The account user can combine any note pads to show on one note pad.

Figure 24:
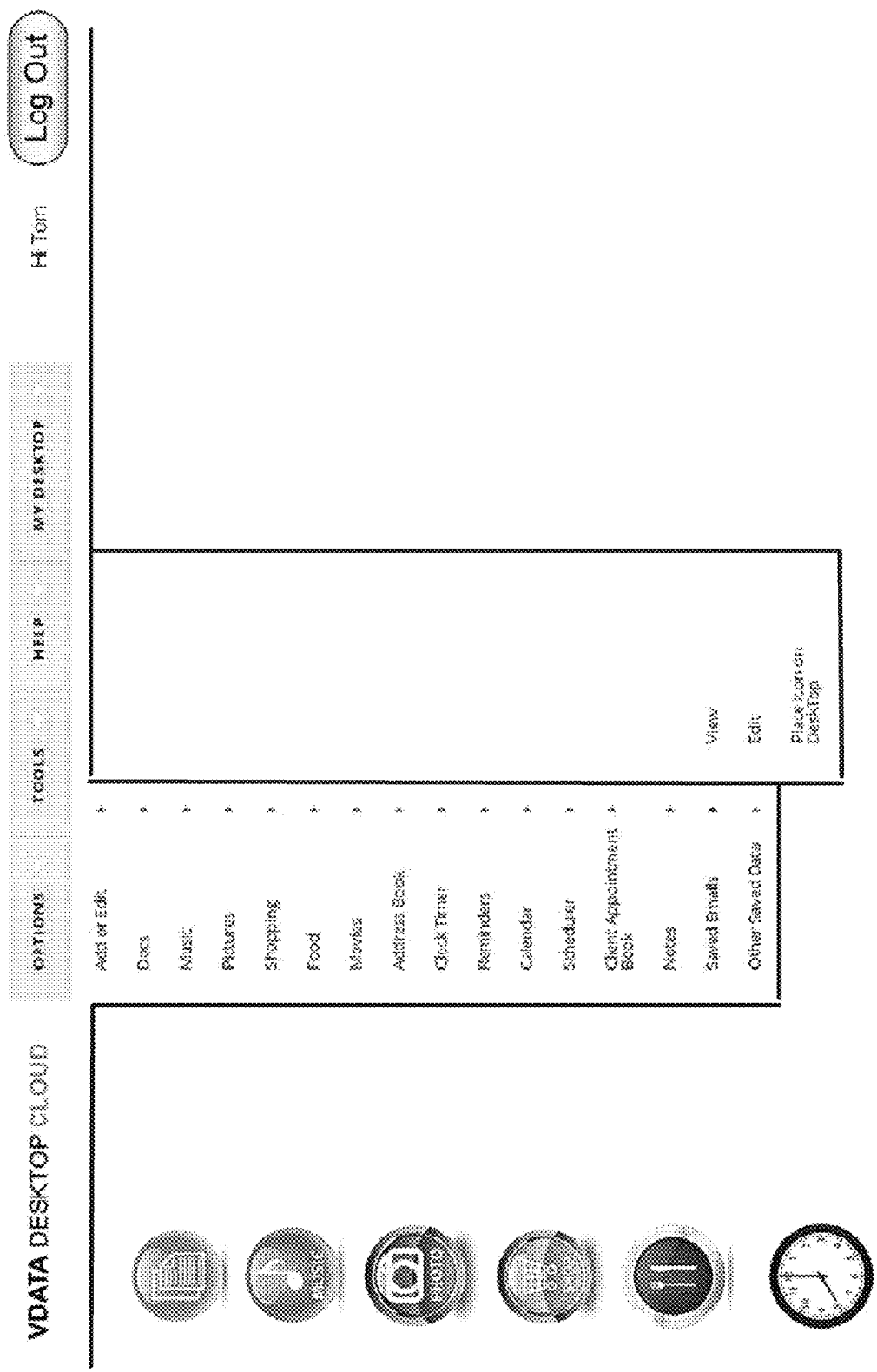
FIG. 24. shows the options menu drop down showing an account user can add, edit or delete a email.

FIG. 24. shows the options menu drop down showing an account user can add, edit or delete a email. The account user can forward important emails manually or set up an auto email forward from their email account to the email storage system.

Figure 25:
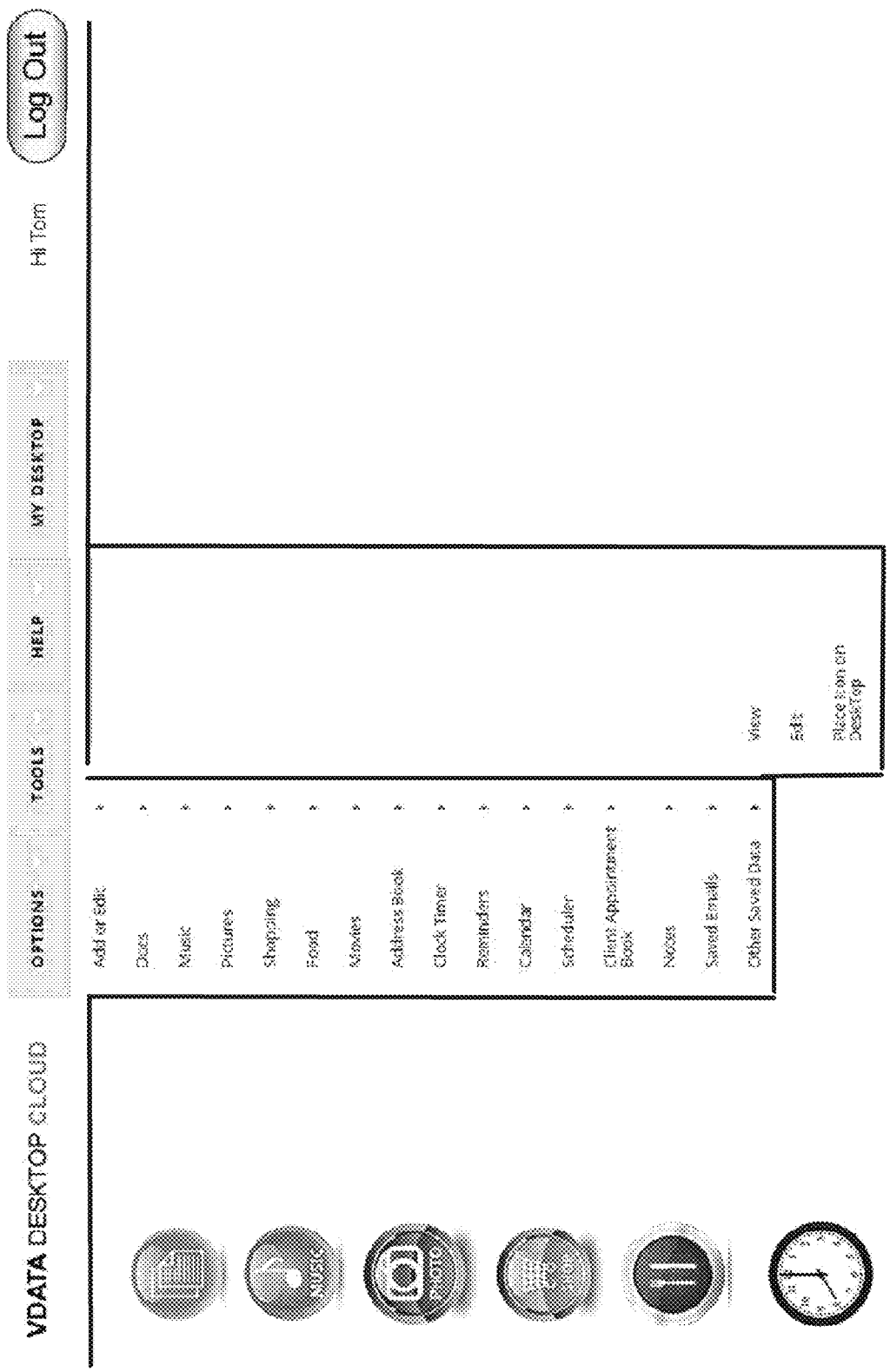
FIG. 25. shows the options menu drop down showing an account user can add, edit or delete other data files and software programs.

FIG. 25. shows the options menu drop down showing an account user can add, edit or delete other data files and software programs. The account user can upload and store any type of digital data files for any format. This feature is great for storing software programs.

Figure 26:
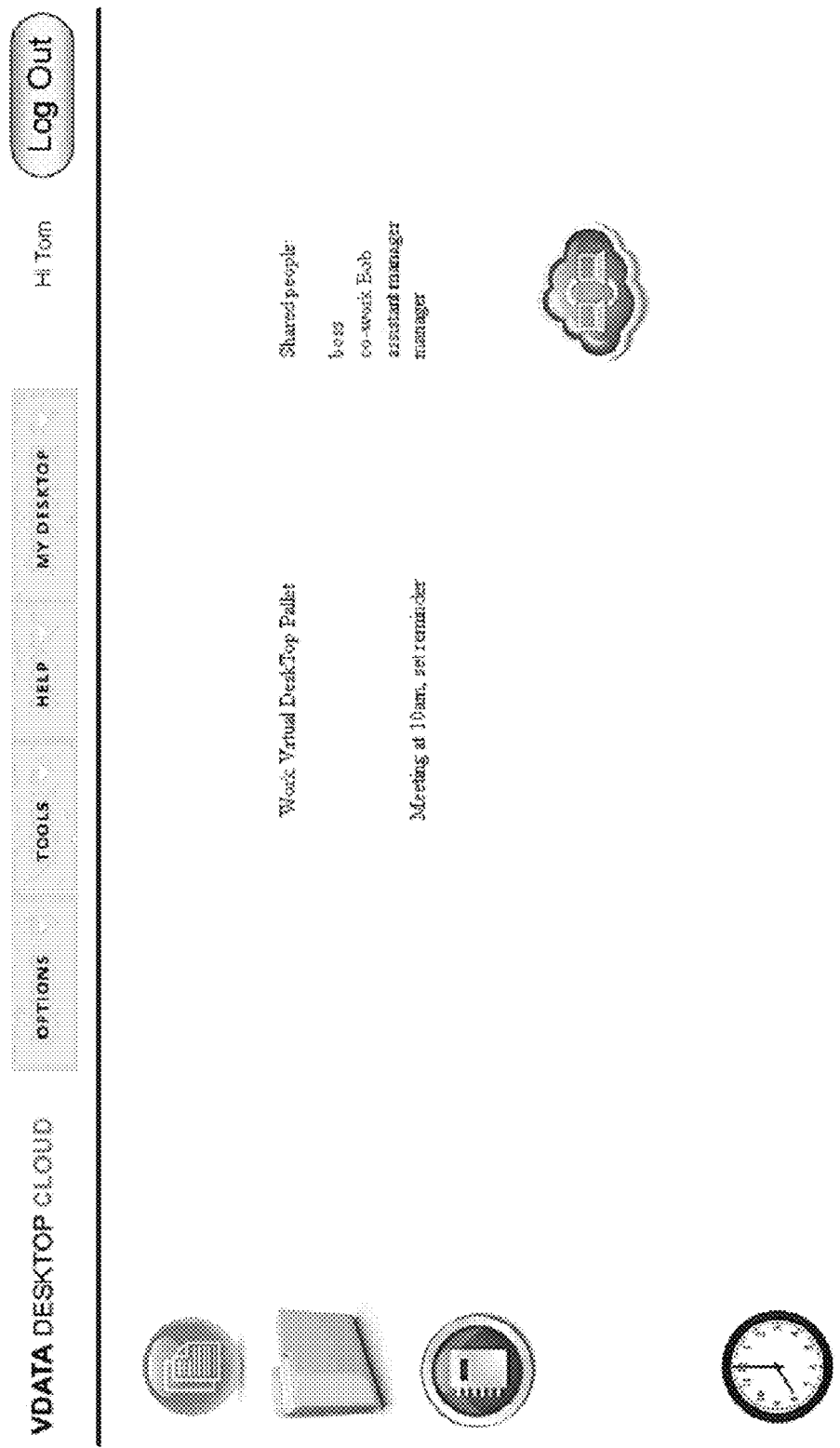
FIG. 26. shows a work virtual desktop with shared files on left and shared users on the right.

FIG. 26. shows a work virtual desktop with shared users' icons and files. Files displayed on the left side are the primary account user's files that are shared with a list of sub account users displayed on the right side of the virtual desktop. Files rights can be setup for viewing, editing or re-sharing for each account user and each icon and file shared. Each account user has the ability to simultaneously share icons with files and virtual desktops with another account user. The account user that initiates the sharing option to another account user is the primary account user to the shared sub account user. That sub account user can also share icons with files back to the first account user making them the sub account user only for those shared icon and files.

Figure 27:
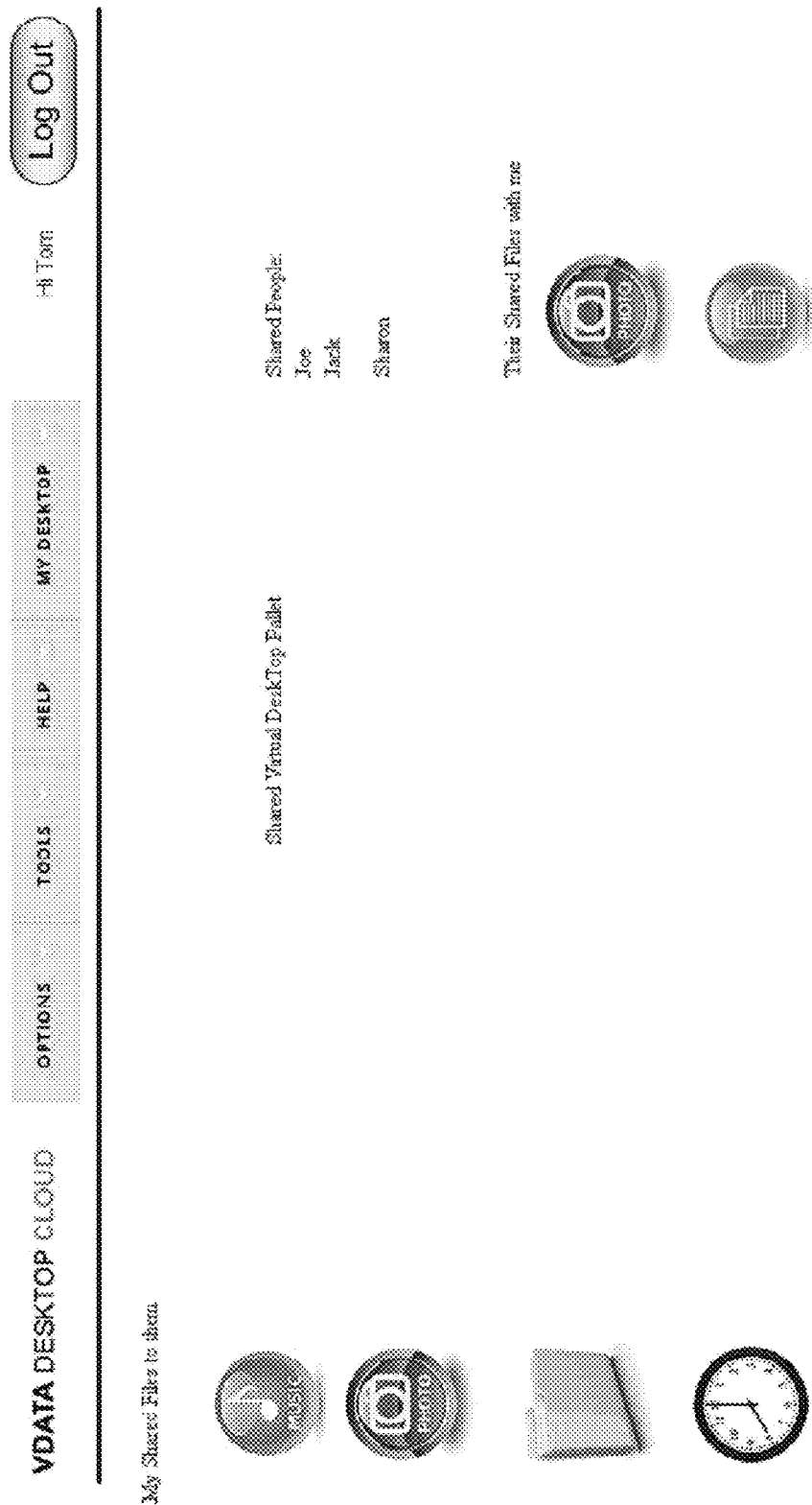
FIG. 27. shows a shared virtual desktop with primary user files on the left and the shared sub users with their files on the right.

FIG. 27. shows a shared virtual desktop with shared users' icons and files. Files displayed on the left side are the primary account user's files that are shared with a list of sub account users displayed on the right side of the virtual desktop. Permissions can be set to: none, view only, edit all files, edit some selected files, re-share files, no re-share files, download files, upload files, change icon functions, not able to change icon functions, or limited edits for each account user and each icon and file shared. Each account user has the ability to simultaneously share icons with files and virtual desktops with another account user. The account user that initiates the sharing option to another account user is the primary account user to the shared sub account user. That sub account user can also share icons with files back to the first account user making them the sub account user only for those shared icon and files.

Figure 28:
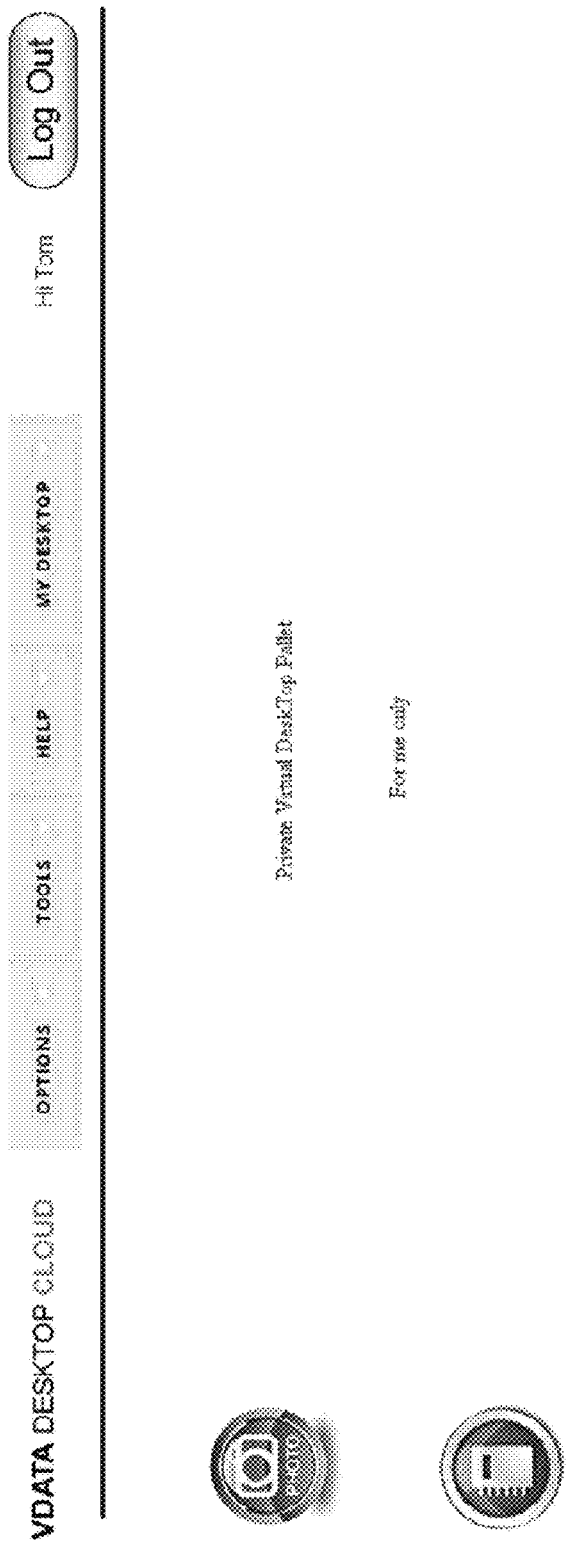
FIG. 28. shows a private virtual desktop with personal files.

FIG. 28. shows a private virtual desktop with stored files and icons. The account user can create this virtual desktop for private use only. The account user can setup an additional password for this virtual desktop for extra security.

Figure 29:
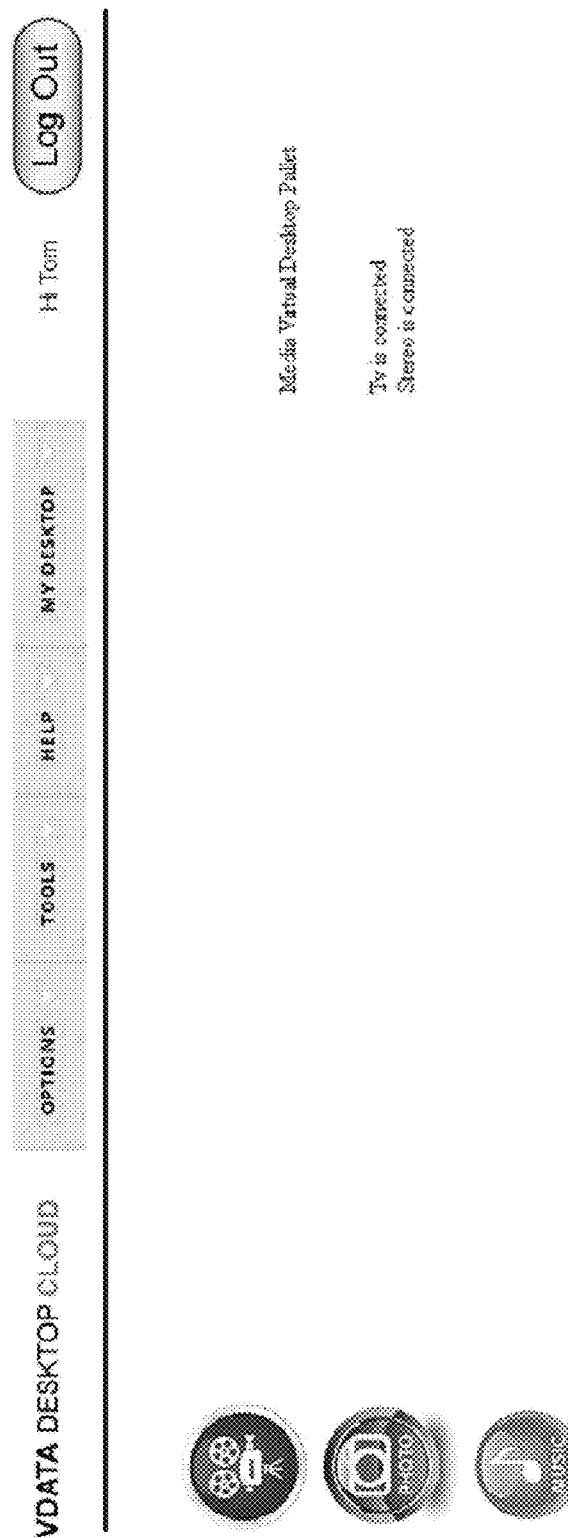
FIG. 29. shows a media virtual desktop with music, movies and pictures files and devices connected for viewing and listening.

FIG. 29. shows a media virtual desktop with devices connected and stored files and icons. The account user can create this virtual desktop for storing all their music and video files. The account user can then watch or listen the selected file on the account users device being a mobile computer stereo or tv with a browser and internet connection.

Figure 30:
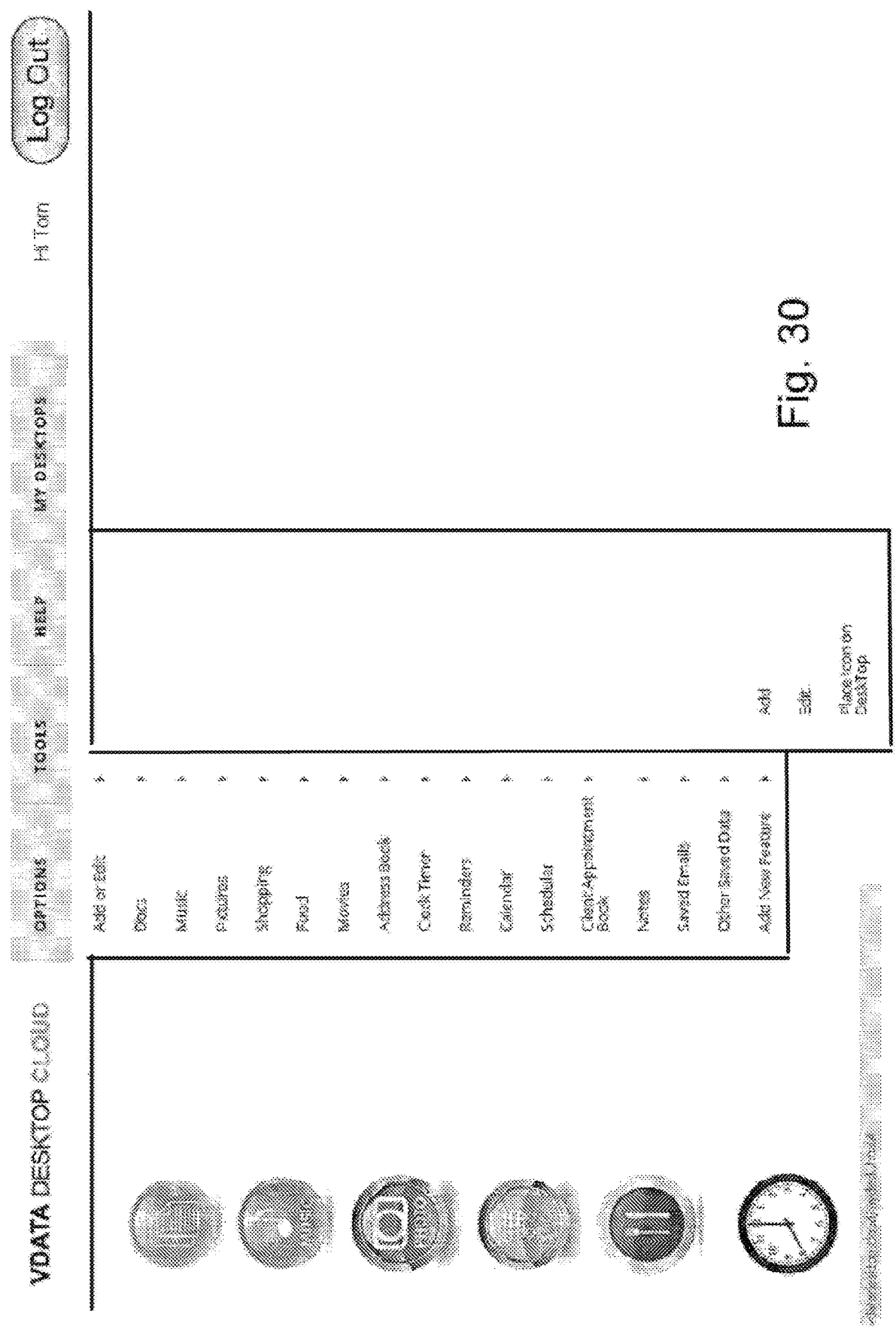
FIG. 30 shows the options menu drop down with the last option allowing the addition of anything.

FIG. 30 shows the options menu drop down with the last option allowing the addition of anything. This makes it easy for a business to add a work order or the like for example.

A particular feature of embodiments of the present invention is account creation. The system allows an account user to create an account by navigating with the user device's browser to the signup page and filling in the users email address as the user ID and creating a password at the signup menu. An email with a link is sent to that email address to verify the new account user. When the new user opens their email and clicks on the supplied link this activates the new account. Once the user account is active the account user can log into the virtual system by using their device's browser. The first virtual screen after login is the home virtual desktop. There are dropdown menu links at the top with all the options and tools to create icons, which the account user can attach functions and files to each created icon and create multiple virtual desktops. The system allows the account user to then leave that icon in the dropdown menu tab or place that icon on any virtual desktop for easy access to that function or file. The system allows the account user to create multiple virtual desktops, one for work files, another for personal files, and another for shared files. Each virtual desktop displays a top menu bar with all the features of the system. The system allows the account user to share any of the virtual desktops they have created with another account user, or setup one separate shared virtual desktop for multiple account users, or create a separate shared virtual desktop for each individual shared user, keeping them all separate. All are accessible and controlled by the primary account user who created them.

Setting up shared files is very easy. The system allows the account user to select any virtual desktop or create a new separate shared virtual desktop. From that virtual desktop any icons with the attached files associated with that virtual desktop can be shared with another account user by clicking on the tool drop down menu and selecting (Setup Desktop File Sharing).

The tool function lets the account user add a person's email address. If the email address is in the system then the virtual desktop is shared with that account user. If the email is not in the system then an email with a link to create a new account is sent to that email address.

The system allows the account user to then select which icons with files can be shared with the shared account user. The system allows the account user to also setup file rights for each icon and files as to what functions the shared account user can have access to. Permissions can be set to: none, view only, edit all files, edit some selected files, re-share files, no re-share files, download files, upload files, change icon functions, not able to change icon functions, or limited edits. While this list of permissions is exemplary, any other set of permissions is also within the scope of the present invention.

The system allows each account user the ability to simultaneously share icons with files and virtual desktop with another account user. The account user that initiates the sharing option to another account user is the primary account user to the shared sub account user. That sub account user can also share icons with files back to the first account user making them the sub account user only for those shared icon and files.

When the account user has selected their shared virtual desktop for viewing, the account users shared icons with attached files are displayed on the left side of their virtual desktop. Displayed on the right side of there virtual desktop shows a list of shared icons and attached files from other account users shared files back with the first account user.

The system allows other functions and features of the virtual desktop data storage retrieval system such as, storage of any type of data files including documents, pictures, music, video, hyper links and all types of digital data files and software. The virtual desktop data storage retrieval system has built in features for which the account user can create multiples of the same features. These features include: address book, clock timer, reminder, calendar, scheduler, note pad, email storage, client appointment book, media storage, music and video streaming, secure data safe, video conferencing and virtual desktop.

The virtual desktop data storage retrieval system is designed for both a personal user and business users. The system allows the account user to upload their own picture files to replace the default icons in the system and can change the text font, background skin and colors.

Figure 31:
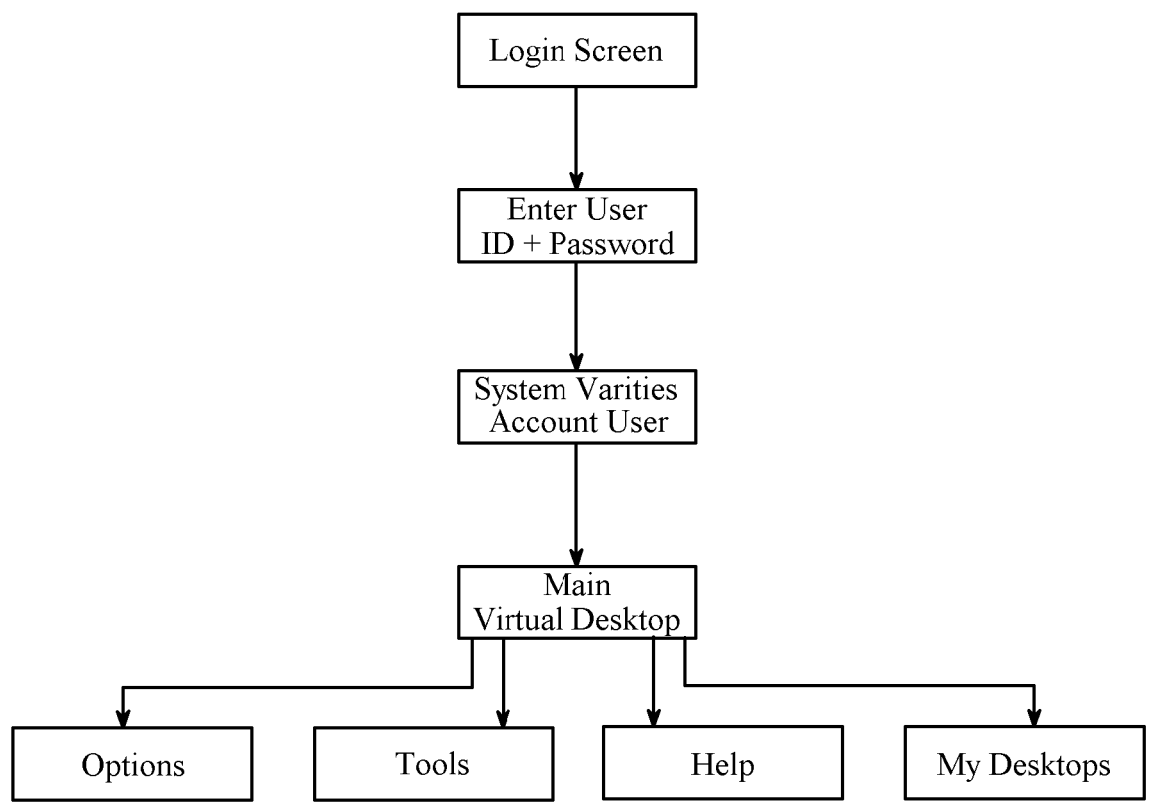
FIG. 31 is a flow diagram of a logon.

FIG. 31 shows an embodiment of a login function. From the login screen, the user enters a password. The system verifies that the user logging on is an account user. If so, the user sees the main virtual desktop screen that allows the user to click an options icon, a tools icon, a help icon or on my desktops. While this is the starting screen, menus for all of these functions appear on every virtual desktop.

Figure 32:
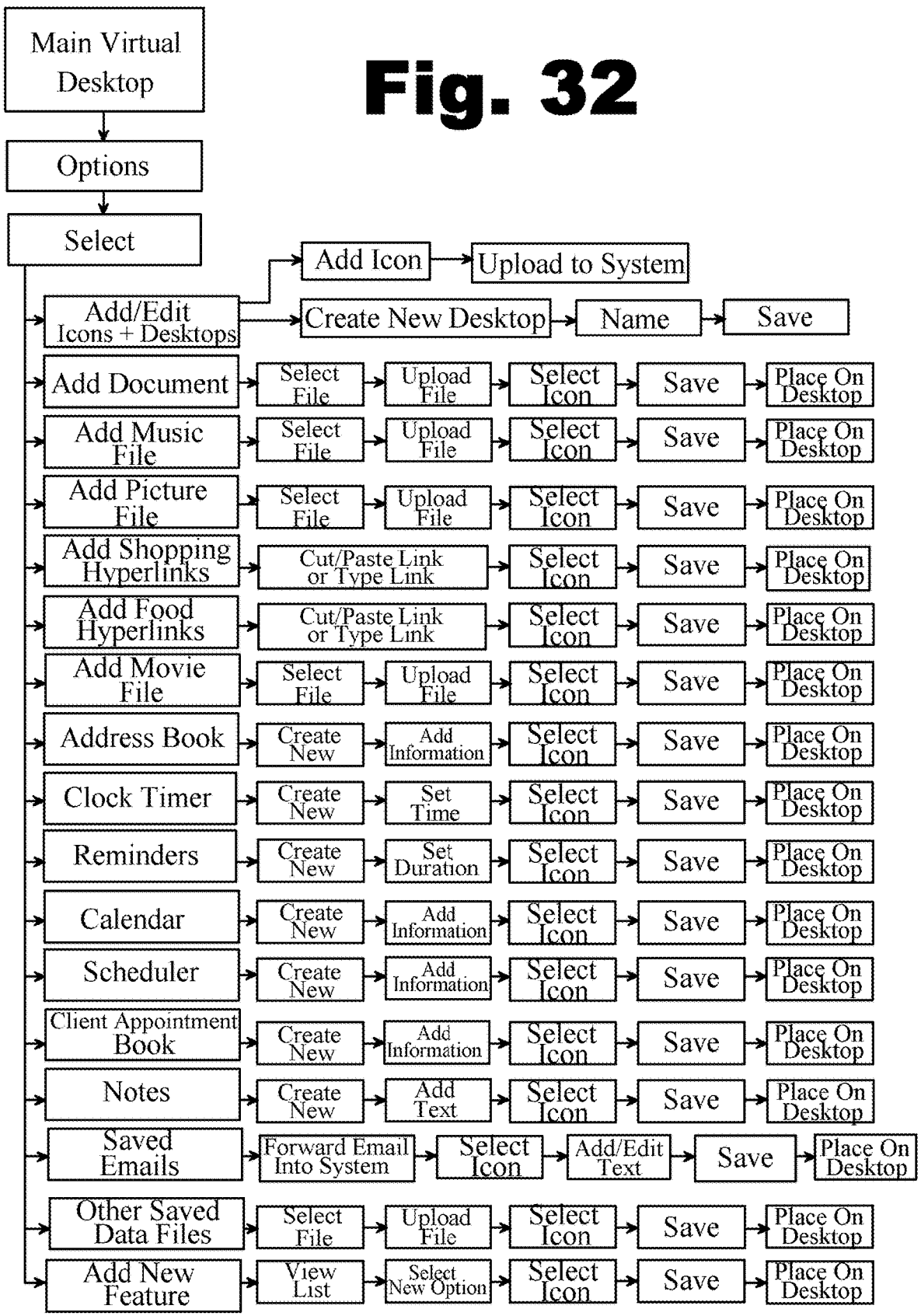
FIG. 32 is a flow diagram of embodiments of various options.

FIG. 32 shows a flow chart of the options function. There are numerous options possible that the user can use including, but not limited to, add icons or virtual desktops, add a document to a virtual desktop, add a music file, add a picture, add shopping hyperlinks, add food hyperlinks, add movie files, access an address book, access a clock timer, access and update reminders, access a calendar, access a scheduler, access a client appointment book, access notes, access saved emails and access other saved data files. There are numerous other possibilities for options. Any option for any function is within the scope of the present invention.

Figure 33:
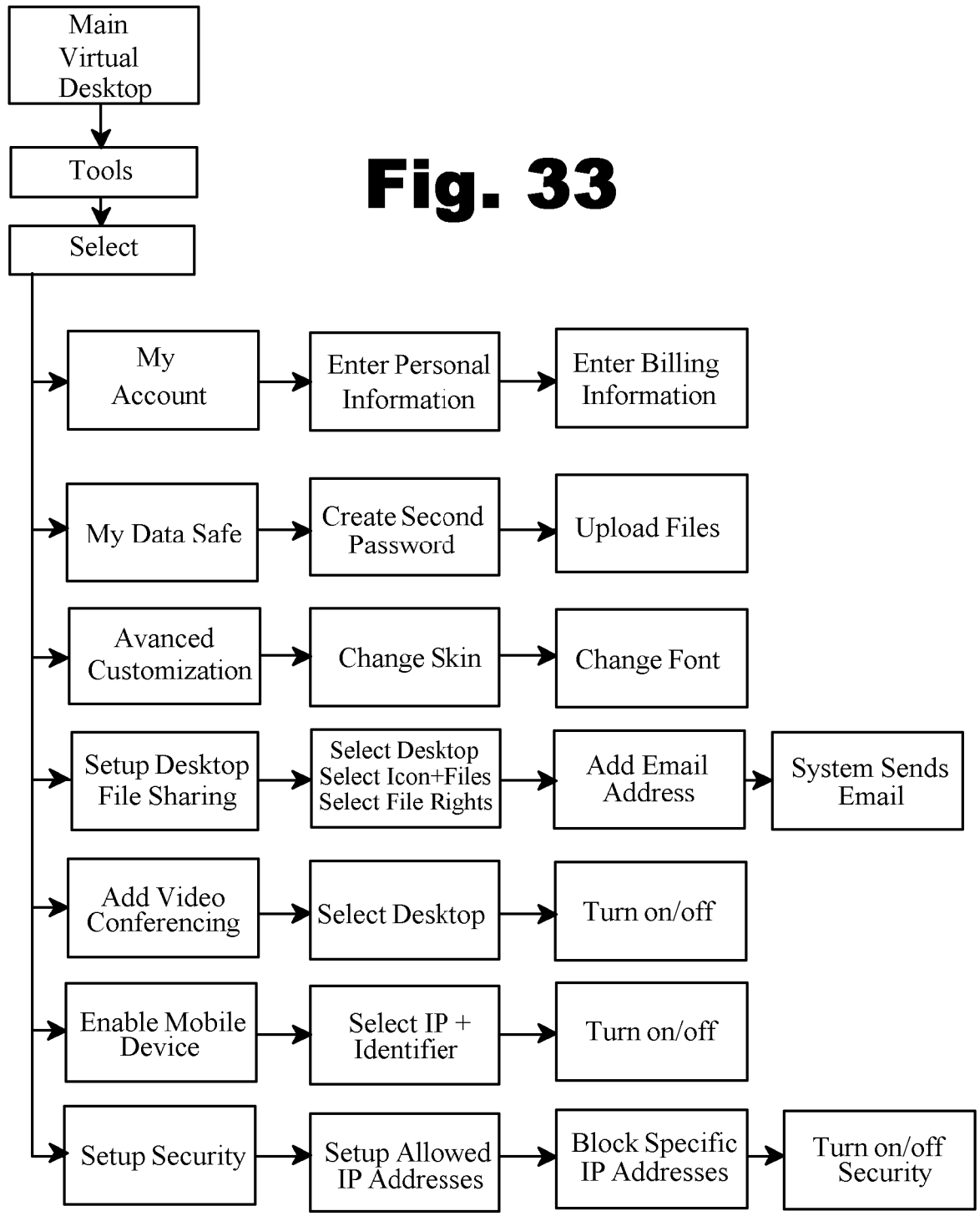
FIG. 33 is a flow diagram of an embodiment of the tools function.

FIG. 33 shows a flow chart of the tools function. Tools allow a user top access his account, his data safe, customize a desktop or screen, setup file sharing, access video conferencing, enable a mobile drive and setup security by selecting or blocking various IP addresses.

Figure 34:
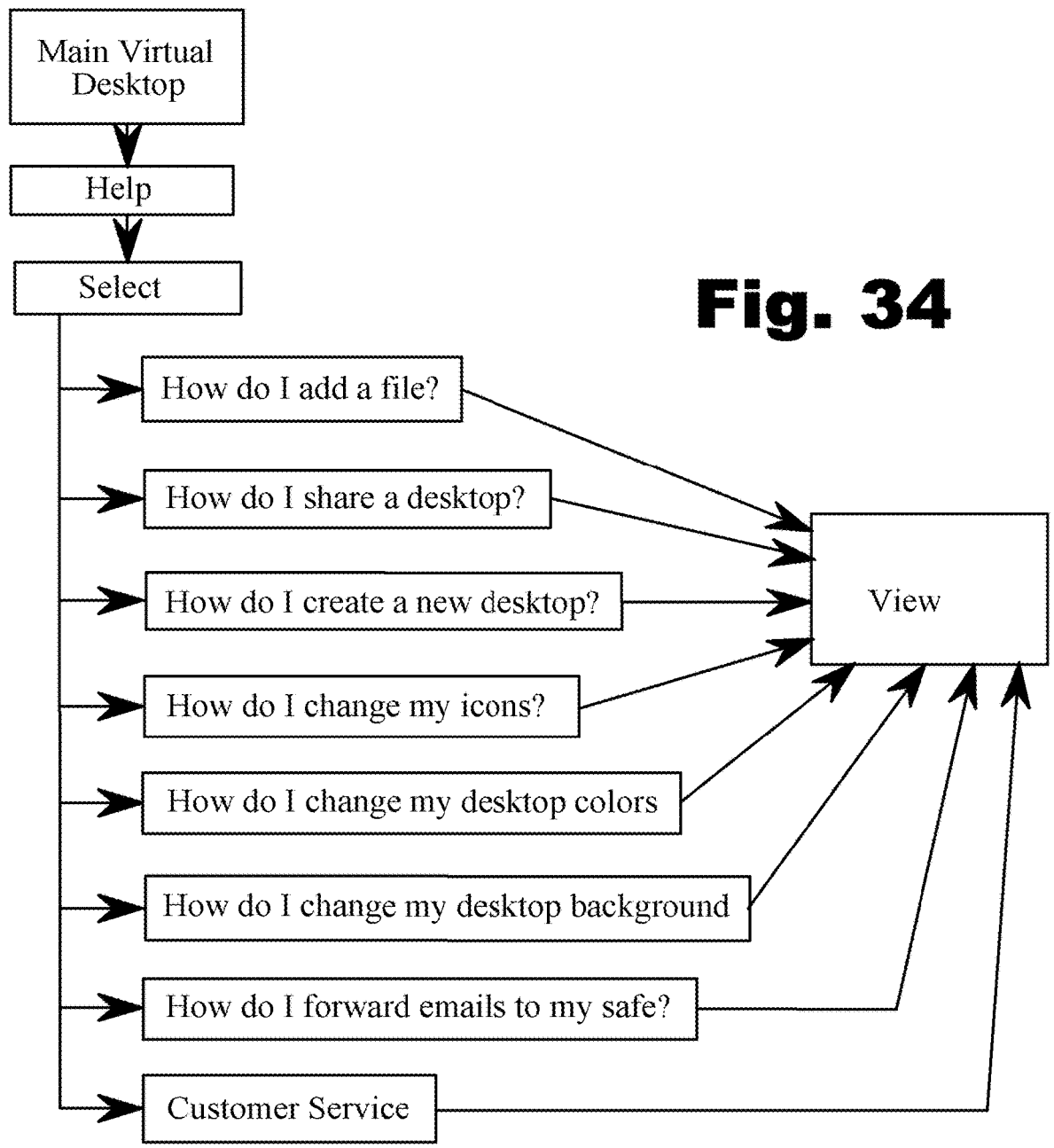
FIG. 34 is a flow diagram of an embodiment of the help function.

FIG. 34 shows a flow chart of the help function. The help menu answers various "how do I . . . ? type questions such as how do I share a file or how do I create a new desktop. Typically, the help function attempts to have an answer about how to use every feature of the system.

FIG. 35 shows a chain of created virtual desktops that derive from the main virtual desktop. In this particular example, there are several choices: my desktops which shows all created virtual desktops as selections; select the home desktop; select work desktop; select shared desktop (one that can be accessed by another user); select private desktop; and select media desktop. FIG. 35 is for example only. Any number of other desktop selections are within the scope of the present invention.

The system of the present invention runs with various computer equipment. For example, a system computer attached to a network is a means for providing system functions and control such as servers, disk storage, mass storage, cloud computers. The system computer has a means for storing and accessing data that can include disk storage, mass storage, random access memory (RAM), read only memory (ROM), flash memory and any other type of memory or storage device. The system computer can run one or many virtual servers that each act as independent systems on the server and provide a means for creating virtual desktops when users request them on their user devices. The system allows a user device as a means for providing local access to the system computer and can be a PC, laptop, tablet, smart or dumb telephone, or other computing device or any device capable of communicating over a network. The system allows access to the virtual server through a browser means which can be a standard browser such as Chrome™, Firefox™, Internet Explorer™ or any other browser. The local device also has local storage in the form of disk memory, mechanical or solid state, random access memory (RAM), read only memory (ROM), insertable memory modules or any other type of memory device.

It is important to note that the operating system on the user device is used only for low level functions such as accessing local files, running the browser and network access. This virtual desktop storage system uses the user device browser and network to access all of the virtual desktops, icons, and data files supplied by the virtual server over the network to the browser. All file storage and sharing is handled by the virtual server on the system computer using the system storage means.

While the virtual desktops of the present invention may be stored, represented and transmitted in a very simple markup language such as Hypertext Markup Language (HTML), it is far more efficient to assign to each user-created virtual desktop formatting or style using a technology such as Cascading Style Sheets (CSS) and to create actions of icons on the virtual desktop using a script language such as JavaScript. While both CSS and JavaScript are known in the art, they have not been associated with chains of hierarchical virtual desktops. Thus, the layout, colors, fonts and all physical formatting of each virtual desktop can be represented in separate or the same style sheets which are transmitted only once from the server when the virtual desktop is created.

Since the present invention involves hierarchical chains of virtual desktops, an inheritance property of the style language can be an important tool. For example, the general look of a newly created virtual desktop can be inherited from the virtual desktop that created it. Alternatively, the format of the newly created virtual desktop can be altered or redesigned as it is created overriding the inheritance feature of the style language.

Icon functions or actions can likewise be inherited. This can be the simple inheritance of a link to a file or section of script language which can be passed at creation time by the style language. Thus, in some embodiments, like icons on child virtual desktops can perform the same generic functions via the script language as they performed on the parent virtual desktop. While the generic function is the same, the actual result can be different. For example, an icon to a calendar on the parent virtual desktop may point to a different calendar than the same calendar icon on the child virtual desktop; however, the supporting script may be the same by inheritance from the style language with simply a different calendar pointer.

The virtual desktop integrates other hardware devices like a streaming stereo or a streaming television in the virtual desktop with an internet connection or internal hub, router (wired or wireless), and using the computer's browser to control functions and content that is stored by the user account. The virtual desktop is a virtual VCR for video content and a virtual cassette deck for audio content. In addition, the virtual desktop integrates a virtual mobile device that can store voice mails, phone calls and other personal data into the virtual desktop storage safe.

The virtual desktop also integrates other hardware devices that use the internet to pass data such as door bell cameras, baby monitors, sensors, actuators, gadgets, appliances, machines, IoT devices, smoke detectors, refrigerators, smart lighting, heating systems, automobiles, smart watches and medical devices.

Finally, the virtual desktop GUI can be in 3-D and have the ability to integrate and control other cloud applications from the browser.

Several descriptions and illustrations have been presented to aid in understanding the present invention. One with skill in the art will realize that numerous changes and variations may be made without departing from the spirit of the invention. Each of these changes and variations is within the scope of the present invention.

The invention claimed is:

1. A virtual desktop system, comprising:
   A system computer having a processor coupled to a memory;
   a virtual server running on the system computer and adapted to send over a network adapted to manage a plurality of user accounts a one or more virtual desktops for display on a web browser of a user device, where the one or more virtual desktops comprise a one or more icons associated with a one or more functions; and,
   the virtual server is adapted to share with a second user access to the one or more virtual desktops associated with a first user and is adapted to enable each of the first user and the second user to edit the one or more virtual desktops and is adapted to send each edit of the first user for display to the second user in the one or more virtual desktops and to send each edit of the second user for display to the first user in the one or more virtual desktops;
   wherein each user account includes one or more hierarchical chains of user-created virtual desktops;
   wherein each desktop in a chain relates to particular subject matter and includes one or more icons attached to files or functions related to the particular subject matter, and wherein each virtual desktop in the one or more hierarchical chains is adapted to inherit properties from a virtual desktop directly superior to it in the hierarchical chain, said properties including inheritance of icons and icon actions from the virtual desktop directly superior to it.

2. The system of claim 1, wherein the virtual server is adapted to share with the second user access to a virtual desktop associated with the first user in response to the first user sharing the virtual desktop with the second user.

3. The system of claim 1, wherein the one or more icons is a plurality of icons comprising a file icon associated with a file access and editing function, an address book icon associated with an address book access and editing function, a timer icon associated with a timer function, a calendar icon associated with a calendar access and editing function, a notes icon associated with a notes access and editing function, and an email icon associated with an email function.

4. The system of claim 1, wherein the virtual server is adapted to limit a scope of editing of the one or more virtual desktops by the second user based on a one or more permissions defined by the first user.

5. The system of claim 1, wherein the virtual server is adapted to enable the first user or the second user to set a function of the one or more icons within the one or more virtual desktops.

6. The system of claim 1, wherein editing the one or more virtual desktops comprises adding a file, moving an icon, adding or editing a timer, adding or editing a calendar, adding or editing a note, and editing a virtual desktop background.

7. The system of claim 1, wherein the virtual server is adapted to require each user to provide a correct password before the virtual server provides access to the one or more virtual desktops.

8. The system of claim 1, wherein
   the virtual server is adapted to share with the second user access to the one or more virtual desktops associated with the first user in response to the first user sharing the one or more virtual desktops with the second user;
   the virtual server is adapted to limit a scope of editing of the one or more virtual desktops by the second user based on a one or more permissions defined by the first user;
   the virtual server is adapted to enable the first user or the second user to set a function of the one or more icons within the one or more virtual desktops; and
   editing the one or more virtual desktops comprises adding a file, moving an icon, adding or editing a timer, adding or editing a calendar, adding or editing a note, and editing a virtual desktop background.

9. A virtual desktop system, comprising:
a system computer having a processor coupled to a memory;
a virtual server running on the system computer and adapted to send over a network adapted to manage a plurality of user accounts a one or more virtual desktops for display on a web browser of a user device, where the one or more virtual desktops is associated with a user, and where the one or more virtual desktops comprises one or more icons; and,
the virtual server is adapted to enable the user to set a function of the one or more icons within the one or more virtual desktops;
wherein each user account includes one or more hierarchical chains of user-created virtual desktops;
wherein each desktop in a chain relates to particular subject matter and includes one or more icons attached to files or functions related to the particular subject matter, and wherein each virtual desktop in the one or more hierarchical chains is adapted to inherit properties from a virtual desktop directly superior to it in the hierarchical chain, said properties including inheritance of icons and icon actions from the virtual desktop directly superior to it.

10. The system of claim 9, wherein the one or more icons is a plurality of icons comprising a file icon associated with a file access and editing function, an address book icon associated with an address book access and editing function, a timer icon associated with a timer function, a calendar icon associated with a calendar access and editing function, a notes icon associated with a notes access and editing function, and an email icon associated with an email function.

11. The system of claim 9, wherein the virtual server is adapted to enable the user to further edit the one or more virtual desktops, which comprises adding a file, moving an icon, adding or editing a timer, adding or editing a calendar, adding or editing a note, and editing a virtual desktop background.

12. The system of claim 9, wherein the virtual server is adapted to require the user to provide a correct password before the virtual server provides the user with access to the one or more virtual desktops.

13. The system of claim 9, wherein
the virtual server is adapted to enable the user to further edit the one or more virtual desktops, which comprises adding a file, moving an icon, adding or editing a timer, adding or editing a calendar, adding or editing a note, and editing a virtual desktop background; and,
the virtual server is adapted to require the user to provide a correct password before the virtual server provides the user with access to the one or more virtual desktops.

14. The system of claim 1, wherein the virtual server is adapted to enable the first user or the second user to add one or more icons within the one or more virtual desktops.

15. The system of claim 9, wherein the virtual server is adapted to enable the first user or the second user to add one or more icons within the one or more virtual desktops.

16. The system of claim 14, wherein the virtual server is further adapted to enable the first user or the second user to add one or more icons within one or more virtual desktops that are not shared with the other user.

17. The system of claim 15, wherein the virtual server is further adapted to enable the first user or the second user to add one or more icons within one or more virtual desktops that are not shared with the other user.

18. A virtual desktop data storage system comprising:
a system computer having a processor coupled to a memory;
a virtual server running on the system computer and on a network adapted to manage a plurality of user accounts, each user account including one or more hierarchical chains of user-created virtual desktops, wherein each desktop in a chain relates to particular subject matter and includes one or more icons attached to files or functions related to the particular subject matter, and wherein each virtual desktop in the one or more hierarchical chains is adapted to inherit properties from a virtual desktop directly superior to it in the hierarchical chain, said properties including inheritance of icons and icon actions from the virtual desktop directly superior to it;
the virtual server configured to support a user device operatively connected to the network that includes a web browser, the user device including a display and local storage; the virtual server adapted to verify user access information received from the user device for a particular user account and to create and display said virtual desktop and said icons on the display; and,
wherein, said user-created virtual desktops are formatted using a style language and wherein, icons on said virtual desktops are linked to other virtual desktops by a script language;
wherein the virtual server is adapted to enable the user to edit the virtual desktops, which comprises adding a file, moving an icon, adding or editing a timer, adding or editing a calendar, adding or editing a note, and editing a virtual desktop background.

* * * * *